(12) United States Patent
Orsini et al.

(10) Patent No.: US 10,371,496 B2
(45) Date of Patent: Aug. 6, 2019

(54) TAPE MEASURE

(71) Applicant: Stanley Black & Decker, Inc., New Britain, CT (US)

(72) Inventors: Antony Orsini, Oradell, NJ (US); Chirag Kamani, West Hartford, CT (US); John Delneo, Kaneohe, HI (US)

(73) Assignee: Stanley Black & Decker, Inc., New Britain, CT (US)

( * ) Notice: Subject to any disclaimer, the term of this patent is extended or adjusted under 35 U.S.C. 154(b) by 221 days.

(21) Appl. No.: 15/357,168

(22) Filed: Nov. 21, 2016

(65) Prior Publication Data

US 2018/0120074 A1    May 3, 2018

(30) Foreign Application Priority Data

Nov. 3, 2016    (EP) ..................................... 16197179

(51) Int. Cl.
*G01B 3/10*    (2006.01)

(52) U.S. Cl.
CPC ............. *G01B 3/1041* (2013.01); *G01B 3/10* (2013.01); *G01B 3/1005* (2013.01);
(Continued)

(58) Field of Classification Search
CPC .......... G01B 3/1056; G01B 2003/1048; G01B 2003/103; G01B 3/1041; G01B 3/1071;
(Continued)

(56) References Cited

U.S. PATENT DOCUMENTS 3,214,836 A    11/1965 West
3,942,738 A    3/1976 Rutty
(Continued)

FOREIGN PATENT DOCUMENTS

DE    3344282 A1    6/1984
DE    4033289 A1    4/1991
(Continued)

OTHER PUBLICATIONS

Martinus Passier, Partial European Search Report, dated Feb. 23, 2017, Munich, Germany.
(Continued)

*Primary Examiner* — Yaritza Guadalupe-McCall
(74) *Attorney, Agent, or Firm* — Gabriel A. Haboubi

(57) ABSTRACT

According to an embodiment, a tape measure comprises an accessory removably coupleable to either side of the housing. According to another embodiment, a tape measure comprises an accessory removably coupleable to the housing via a locking mechanism that holds the accessory at a plurality of desired orientations. According to another embodiment, a tape measure comprises a slide lock, where movement of the slide lock from a locked position into an unlocked position requires depression of the actuator towards the interior of the housing. According to another embodiment, a motor assembly for a tape measure comprises a backer plate, a motor body, and a spring, where a bond is applied therebetween. According to another embodiment, a motor assembly for a tape measure comprises a motor body and a spring, where one of a metallurgical bond or an adhesive is applied between the motor body and the spring.

7 Claims, 22 Drawing Sheets

(52) U.S. Cl.
CPC ...... *G01B 3/1071* (2013.01); *G01B 2003/103* (2013.01); *G01B 2003/1007* (2013.01); *G01B 2003/1023* (2013.01); *G01B 2003/1028* (2013.01); *G01B 2003/1038* (2013.01); *G01B 2003/1043* (2013.01); *G01B 2003/1048* (2013.01); *G01B 2003/1074* (2013.01)

(58) Field of Classification Search
CPC .... G01B 2003/1015; G01B 2003/1043; G01B 2003/1079; G01B 2003/1089; G01B 3/1005; G01B 2003/1038; G01B 3/1082; G01B 1/00; G01B 2003/101; G01B 3/1084; G01B 2003/1007; G01B 2003/1023; G01B 2003/1028; G01B 2003/1074; G01B 3/10
USPC .................................................. 33/755–771
See application file for complete search history.

(56) References Cited

U.S. PATENT DOCUMENTS

| | | | | |
|---|---|---|---|---|
| 4,786,010 A * | 11/1988 | Dynan | ................... | B43L 1/00 242/379 |
| 4,924,597 A | 5/1990 | Tursi | | |
| 5,025,966 A | 6/1991 | Potter | | |
| 5,079,851 A * | 1/1992 | Sill | ................... | B43L 1/00 33/760 |
| 5,430,952 A * | 7/1995 | Betts | ................... | G01B 3/1084 33/760 |
| 5,459,942 A * | 10/1995 | Hintz, Jr. | ................ | G01B 3/1084 33/760 |
| 5,575,077 A | 11/1996 | Tae | | |
| 5,711,085 A * | 1/1998 | Adams | ................... | B25H 7/04 33/668 |
| 5,806,202 A | 9/1998 | Blackman et al. | | |
| 5,809,662 A * | 9/1998 | Skinner | ................ | G01B 3/1071 33/42 |
| 5,845,413 A * | 12/1998 | Zayat, Jr. | ............. | G01B 3/1084 33/760 |
| 6,108,926 A * | 8/2000 | Fraser | ..................... | B44D 3/38 33/758 |
| 6,161,299 A | 12/2000 | Lin | | |
| 6,167,635 B1 | 1/2001 | Lin | | |
| 6,272,764 B1 | 8/2001 | Lin | | |
| 6,463,670 B1 | 10/2002 | Usami | | |
| 6,467,182 B2 | 10/2002 | Usami | | |
| 6,490,809 B1 | 12/2002 | Li | | |
| 6,536,698 B2 | 3/2003 | Hsu | | |
| 8,117,763 B2 | 2/2012 | Delneo et al. | | |
| 8,898,922 B2 * | 12/2014 | Bridges | ................ | G01B 3/1005 33/767 |
| 2003/0167651 A1 * | 9/2003 | Pedersen | .............. | G01B 3/1071 33/758 |
| 2005/0268480 A1 * | 12/2005 | Potter | .................. | G01B 3/1056 33/768 |
| 2006/0230627 A1 * | 10/2006 | Blackman | ................. | A45F 5/02 33/761 |
| 2007/0056182 A1 * | 3/2007 | Di Bitonto | ........... | G01B 3/1005 33/767 |
| 2009/0064526 A1 | 3/2009 | Farnworth et al. | | |
| 2015/0040416 A1 | 2/2015 | Bridges et al. | | |
| 2018/0120074 A1 * | 5/2018 | Orsini | .................. | G01B 3/1005 |

FOREIGN PATENT DOCUMENTS

| | | |
|---|---|---|
| DE | 20004957 U1 | 8/2008 |
| GB | 894505 A | 4/1962 |
| GB | 1383697 A | 2/1974 |
| WO | WO-03/096839 A1 | 11/2003 |

OTHER PUBLICATIONS

Annex to the European Search Report on European Patent Application No. EP 16 19 7179, dated Feb. 14, 2017.
Martinus Passier, European Search Report, dated Mar. 21, 2017, Munich, Germany.
Annex to the European Search Report on European Patent Application No. EP 16 19 7179, dated Mar. 9, 2017.

* cited by examiner

TAPE MEASURE

FIELD OF THE INVENTION

The present invention relates generally to hand tools, and more particularly to tape measures.

BACKGROUND OF THE INVENTION

Tape measures conventionally include a retractable tape having measuring indicia thereon that is spring biased into a housing. A front of the tape commonly includes a hook that provides a surface to engage and fix the end of the tape against a point to be measured from, so the measurement can be made from the hook to a position on the tape indicated by the measuring indicia. The housing often has a lock mechanism that allows the tape to be locked into a certain position relative to the housing (e.g., locked into an extended position, preventing the spring bias from retracting the tape into the housing). The housing may also often have a belt clip located thereon that allows users to clip the tape measure onto their belt. Further, in the assembly of tape measures, the tape is typically fixed to a motor assembly that includes the spring therein, and is tensioned against a fixed hub. Traditional springs are attached to reels or cases in tape measure via physical interlocks, cut into one or more of the spring and an attaching surface, or are assembled with physical retainers such as rivets, screws, or bolts.

Among other things, the present application relates to various improvements to tape measures, including to one or more of the tape locking mechanisms, belt clip functionality, and assembly of the spring into the motor.

SUMMARY OF THE INVENTION

According to an embodiment, a tape measure comprises a housing having a left side and a right side surrounding a front; a tape selectively extendable from and retractable to the front of the housing; and an accessory removably coupleable to the housing. The accessory comprises interlock tabs configured to selectively engage receiving flanges on the housing. The housing comprises engagement flanges on both the left side and the right side such that the accessory may alternatively be coupled to the left side and the right side. In some embodiments the housing further comprises a pivot protrusion configured to engage with a pivot and load aperture on the accessory. In some such embodiments the pivot protrusion is positioned between the engagement flanges on the housing and wherein the pivot and load aperture is positioned between the interlock tabs on the accessory. In some embodiments the engagement flanges encircle the pivot protrusion, and wherein the engagement flanges and the pivot protrusion extend from a recessed portion of the housing. In some embodiments the housing comprises a locking mechanism configured to hold the accessory at a plurality of desired orientations relative to the housing; and the accessory further comprises alignment apertures shaped to engage with the locking mechanism. Some such embodiments further include a gap in the housing behind the locking mechanism, wherein the locking mechanism is biased to protrude forward of the gap to engage with a desired one of the alignment apertures associated with a desired orientation of the accessory relative to the housing. In some embodiments, the locking mechanism comprises one or more of a snap lock and a spring biased protrusion. In some embodiments, the accessory comprises a belt clip.

According to another embodiment, a tape measure comprises a housing having a left side and a right side surrounding a front; a tape selectively extendable from and retractable to the front of the housing; and an accessory removably coupleable to the housing. The housing comprises a locking mechanism configured to hold the accessory at a plurality of desired orientations relative to the housing. The accessory comprises interlock tabs configured to selectively engage receiving flanges on the housing and alignment apertures shaped to engage with the locking mechanism.

According to another embodiment, a tape measure comprises: a housing having a left side and a right side surrounding a front; a tape selectively extendable from and retractable to the front of the housing; and a slide lock at the front configured to selectively clamp the tape to the housing to prevent extension and retraction of the tape from the front of the housing when the slide lock is in a locked position. The slide lock comprises an actuator on an exterior of the housing and a lock engagement tab on an interior of the housing, the actuator and the lock engagement tab being coupled together a portion of the slide lock extending through a channel in which the slide lock is slidable. The lock engagement tab engages with a protrusion in the housing when moving the slide lock from the locked position to an unlocked position, such that movement of the slide lock into the unlocked position requires depression of the actuator towards the interior of the housing to disengage the lock engagement tab from the protrusion.

According to another embodiment, a motor assembly for a tape measure comprises a motor body; a spring; a backer plate; and a bond region formed between the motor body and the backer plate. A first end of the spring is connected to a hub received in the motor body. A second end of the spring is received between the backer plate and the motor body at the bond region. A bond is applied between motor body, the spring, and the backer plate at the bond region to bond the spring, motor body, and backer plate together.

According to another embodiment, a motor assembly for a tape measure comprises a motor body; a spring; and a bond region formed between the motor body and spring. A first end of the spring is connected to a hub received in the motor body. A second end of the spring is received adjacent to the motor body at the bond region. One of a metallurgical bond or an adhesive is applied between the motor body and the spring at the bond region to bond the spring and the motor body together. In some embodiments wherein a metallurgical bond is applied between the motor body and the spring, and the metallurgical bond comprises a weld, a braze, or a solder.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of tape measures in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1:
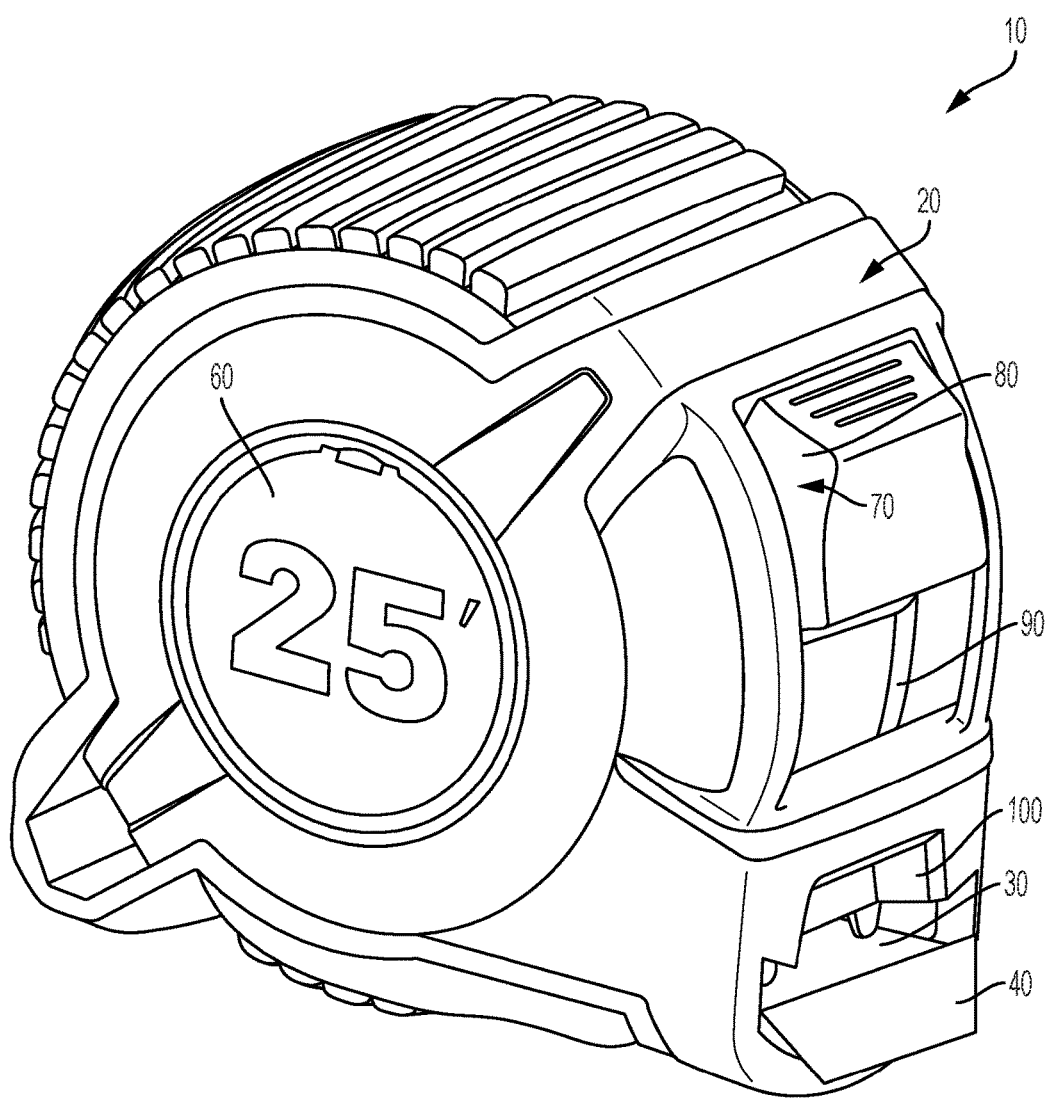
FIG. 1 illustrates a front and right perspective an embodiment of a tape measure of the present disclosure.
Figure 2:
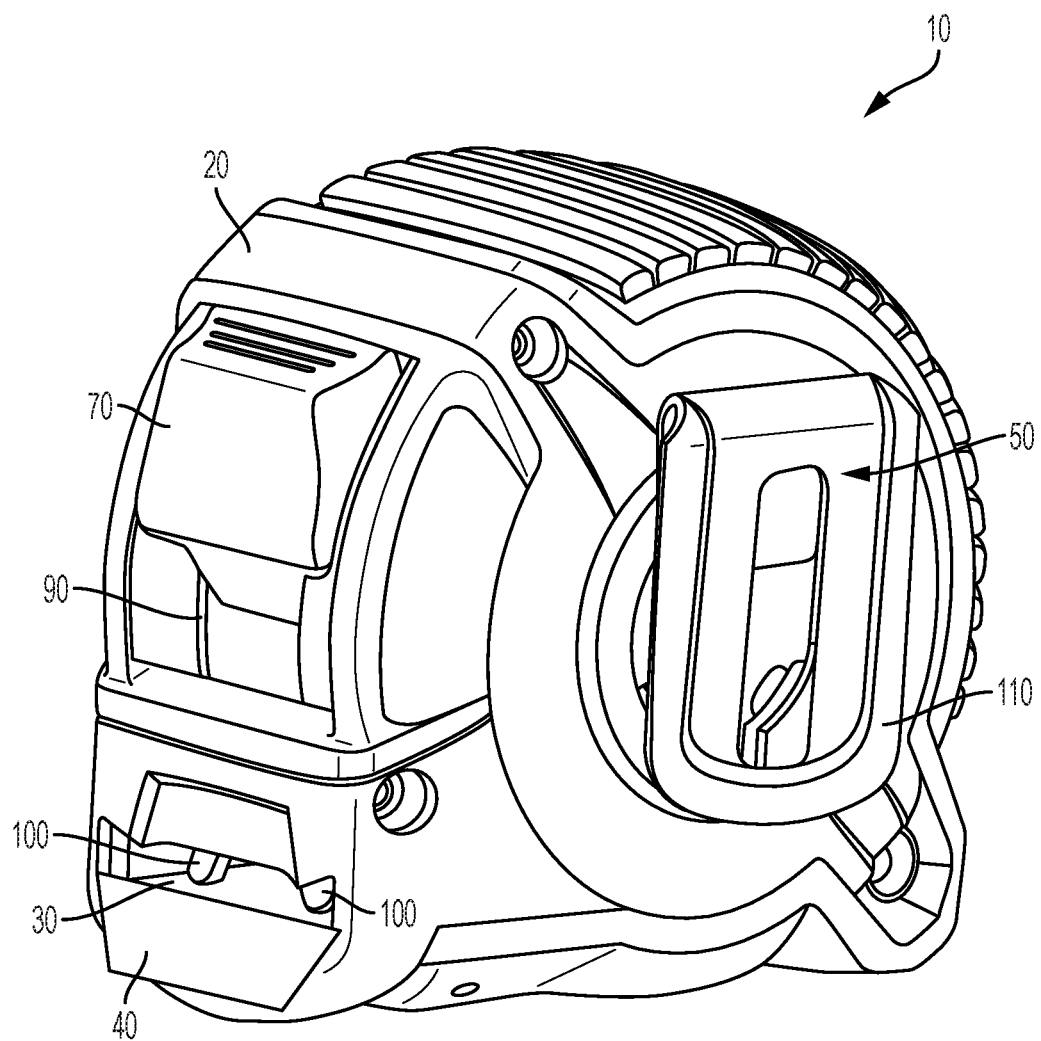
FIG. 2 illustrates a front and left perspective view of the embodiment of the tape measure of FIG. 1, showing a belt clip thereof.

FIGS. 1 and 2 depict opposing perspective views of a tape measure 10 embodying various improvements as disclosed herein. As shown, the tape measure 10 includes a housing 20 containing a tape 30 therein. The tape 30 terminates in a tape hook 40, and is selectively extendable from the tape housing 20. As discussed in greater detail below, the tape measure 10 may include an accessory which in an embodiment may be selectively removable from the housing 20, and in an embodiment may be rotatable within the housing 20. While in the illustrated embodiment the accessory is a belt clip 50, it may be appreciated that other accessories may alternatively or additionally be mounted to and selectively removable from the housing 20. As further described below, in an embodiment the tape measure 10 may include a cover portion 60 on an opposite face of the housing 20, which may in some embodiments also be removable, and may facilitate swapping of the cover portion 60 and the accessory (e.g., the belt clip 50) to facilitate left handed and right handed configurations of the tape measure 10. Further shown in FIGS. 1 and 2 are a slide lock 70 configured to selectively lock the tape 30 relative to the housing 20. As shown, the slide lock 70 may include an actuator 80 which may slide down a channel 90 formed in the housing 20, which may press one or more tape engaging members 100 into the tape 30, which in turn clamp the tape 30 against the housing 20 to fix the tape 30 relative to the housing 20, and prevent retraction of the tape 30 into the housing 20 when otherwise extended against the bias of a spring such as that discussed in greater detail below.

Figure 3:
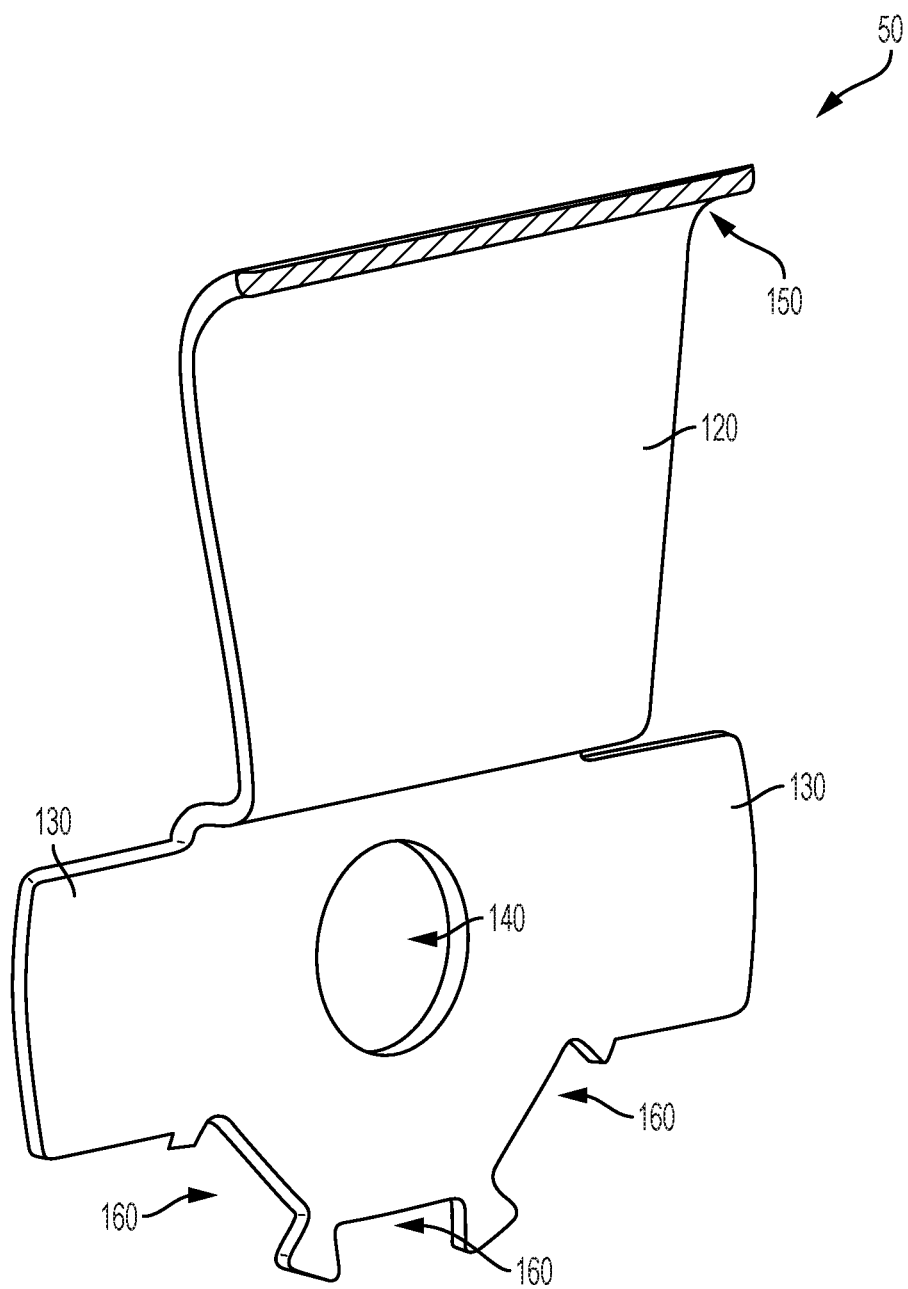
FIG. 3 illustrates an isolated perspective view of an engaging feature of the belt clip.

As further shown in FIG. 2, the belt clip 50 may have a generally U shaped configuration, with an outer portion 110 protruding from the housing 20 to form a hook. It may be appreciated that a belt, article of clothing or other substrate may be positioned between the outer portion 110 and the housing 20, to hang the tape measure 10 thereon. As shown in greater detail in the isolated view of FIG. 3 (where the outer portion 110 of the belt clip 50 is truncated), the belt clip 50 may also include an inner portion 120 which may engage the housing 20 as described in greater detail below. As shown, the inner portion 120 may include interlock tabs 130 which may be received within a portion of the housing and facilitate selectively retaining the belt clip 50 against the housing, while a pivot and load aperture 140 may receive therein a protruding portion of the housing 20 and facilitate rotation of the belt clip 50 so a loop region 150 defining the hook may be oriented at different desired positions relative to a base of the tape measure 10. As further described below, the inner portion 120 may also comprise alignment apertures 160 which may facilitate holding the belt clip at a plurality of differing orientations relative to the housing 20.

Figure 4A:
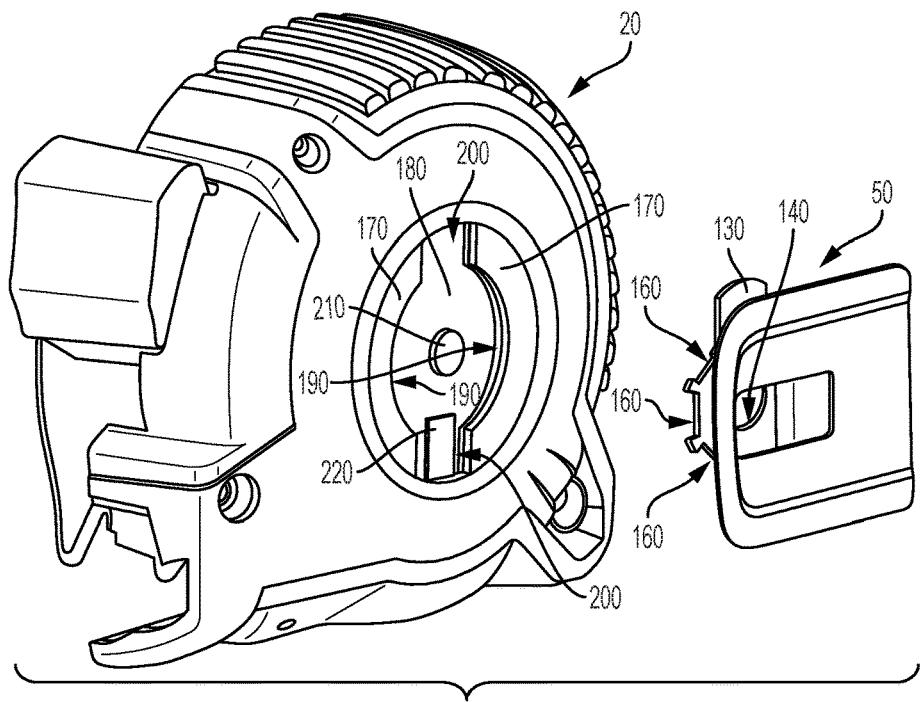
FIGS. 4A-B illustrate left perspective and enlarged sectional views of the tape measure of FIG. 1, showing the belt clip spaced from but aligned to engage to a housing thereof.
Figure 4B:
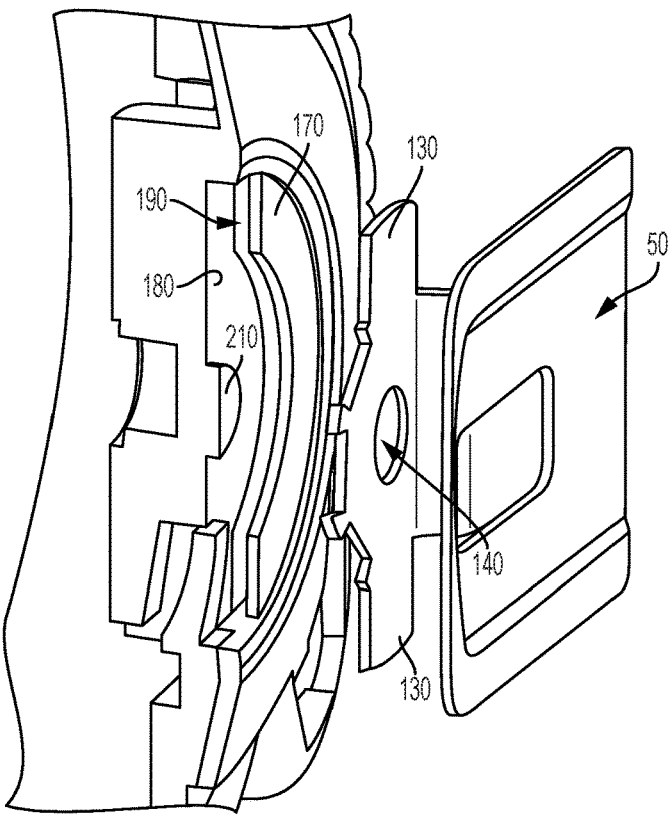

FIGS. 4A-B illustrate an embodiment of assembly of the belt clip 50 into the tape measure 10. As shown in FIG. 4A, the housing 20 may include engagement flanges 170 (e.g., a pair of engagement flanges 170 in the illustrated embodiment) which may extend forward of a recessed portion 180 of the housing 20, creating spaces 190 underneath the engagement flanges 170 sized to receive the interlock tabs 130 of the belt clip when received therein. As further shown, gaps 200 between the engagement flanges 170 may provide a space for the interlock tabs 130 to selectively align with and pass therethrough, so as to facilitate removal of the interlock tabs 130 and accordingly the belt clip 50 from the housing 20.

Further shown in FIG. 4A, the housing 20 may include a pivot protrusion 210 which may engage the pivot and load aperture 140 on the belt clip 50, and provide a point about which the belt clip 50 may rotate. As described in greater detail below, a locking mechanism 220 may also be positioned in the housing 20, and may selectively engage the alignment apertures 160 to hold the belt clip 50 at the desired orientation relative to the housing 20. FIG. 4B illustrates the belt clip 50 oriented with the interlock tabs 130 aligned to be received in the gaps 200, however provides a sectioned perspective view of the housing 20, such that relative depths of the engagement flanges 170, the recessed portion 180, the spaces 190 and the pivot protrusion 210 according to one exemplary embodiment may be appreciated.

Figure 5:
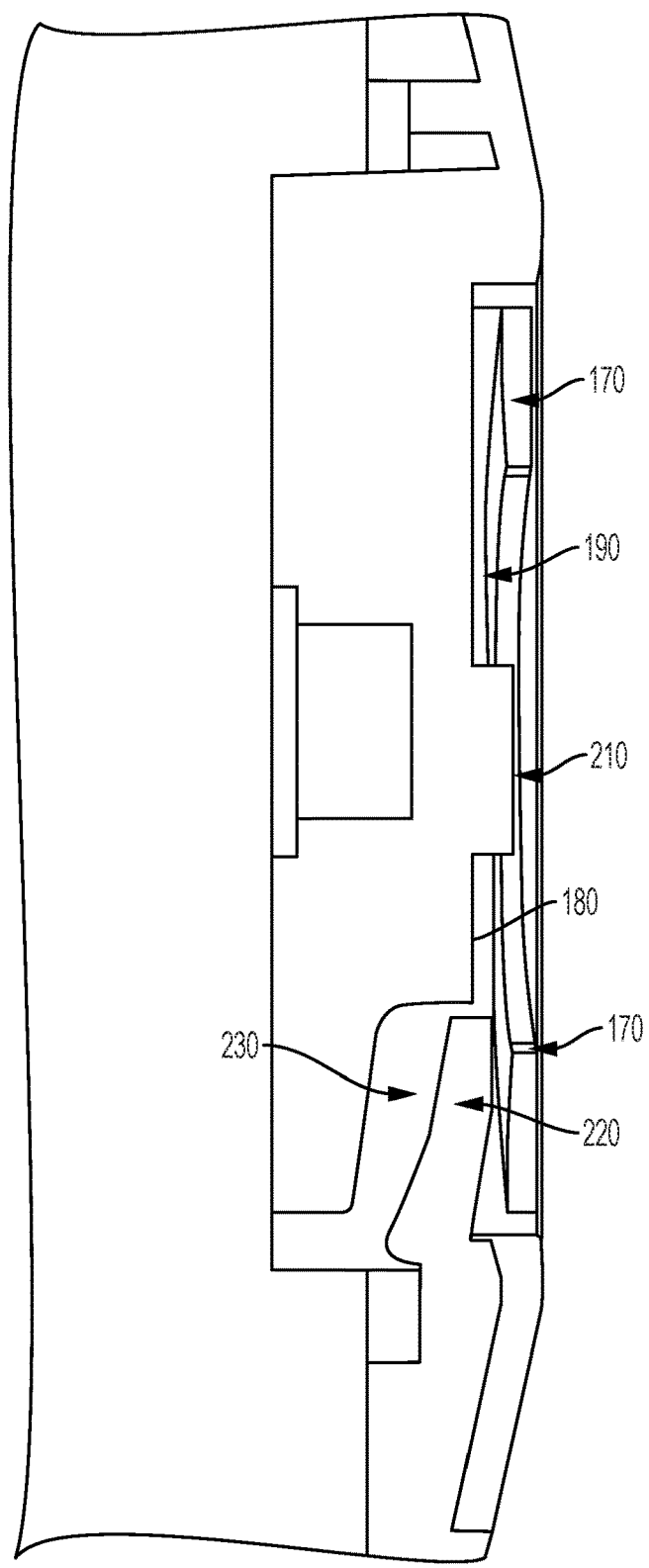
FIG. 5 illustrates a sectional view showing a receptacle on the housing of the tape measure of FIG. 1 configured to receive the belt clip.

FIG. 5 illustrates a planar sectional view of the housing 20, facilitating illustrating operation of an embodiment of the locking mechanism 220 which may selectively engage the alignment apertures 160. As shown, in an embodiment the locking mechanism 220 may comprise a snap lock which may be biased (e.g., through material formation) forward from the recessed portion 180 such that a portion thereof would extend into the alignment apertures 160 preventing rotation of the belt clip 50 about the pivot protrusion 210 when the pivot protrusion 210 is received in the pivot and load aperture 140. It may be appreciated that a gap 230 may be provided behind the locking mechanism 220, such that the locking mechanism 220 may be pressed into the gap 230 so that it moves out of the plane of the alignment apertures 160, and thus the belt clip 50 may be rotated about the pivot protrusion 210. Other configurations of the locking mechanism 220 are possible in other embodiments, including but not limited to a spring biased protrusion or detent selectively engaging with the alignment apertures, for example.

Figure 6A:
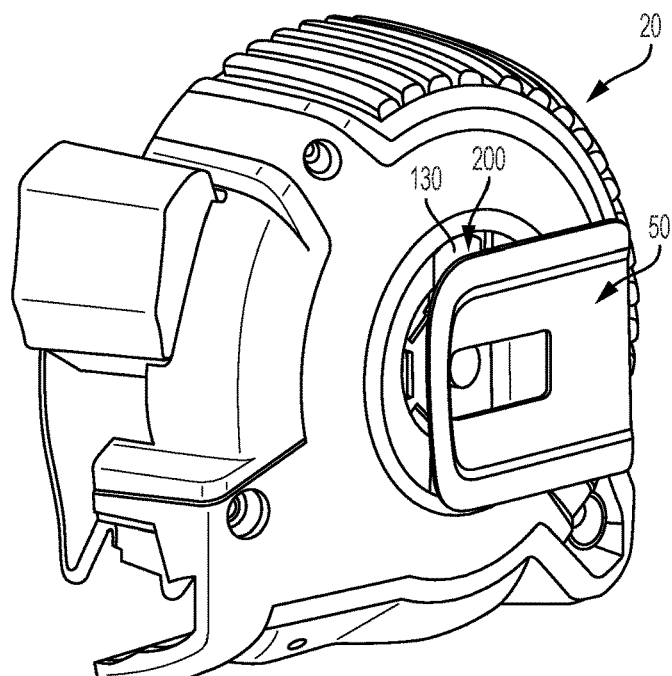
FIGS. 6A-B illustrate left perspective and enlarged sectional views of the tape measure of FIG. 1, showing removable engagement of the belt clip to the housing thereof.
Figure 6B:
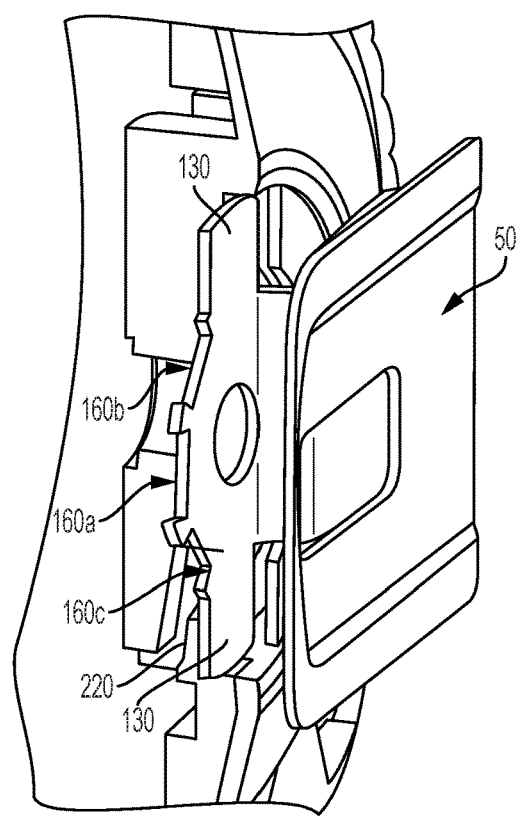

FIGS. 6A, 7A, 8A, and 9A illustrate the belt clip 50 received in the tape housing 20 in various orientations, with the corresponding sectioned perspective views of the housing 20 showing engagement of the interlock tabs 130 and the alignment apertures 160 being illustrated in FIGS. 68, 7B, 88, and 9B respectively for each orientation. As shown in FIGS. 6A-B, for example, the belt clip 50 is positioned so that the interlock tabs 130 are aligned with the gaps 200 so that the belt clip 50 may be pulled out of the recessed portion 180. It may be appreciated in some embodiments that an outer diameter portion of one or more of the alignment tabs and the locking mechanism 220 may be configured so that the belt clip 50 can be rotated into the removal orientation without separate depression of the locking mechanism 220. For example, in an embodiment a wedge shaped region of one or more of the locking mechanism 220 or the interlock tabs 130 may depress the locking mechanism 220 as the interlock tabs 130 are rotated into alignment with the gaps 200.

Figure 7A:
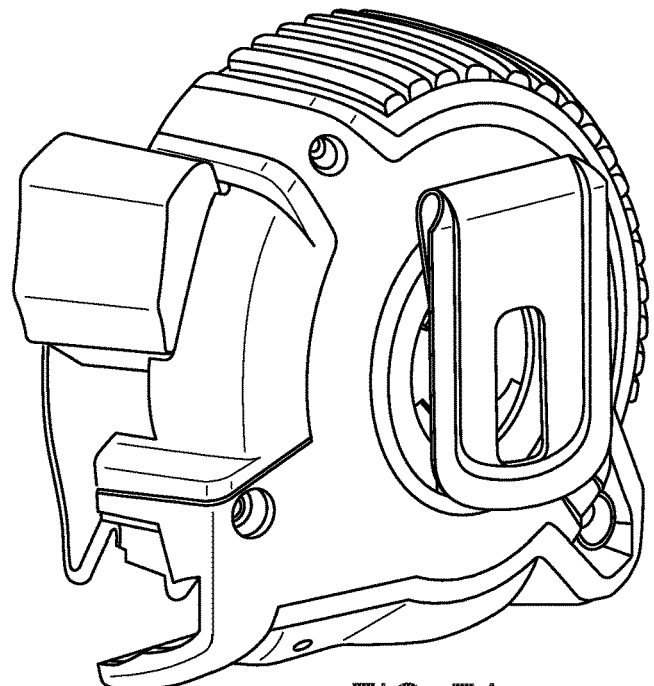
FIGS. 7A-B illustrate left perspective and enlarged sectional views of the tape measure of FIG. 1, showing engagement of the belt clip to the housing thereof as rotated to a downwardly facing hook.
Figure 7B:
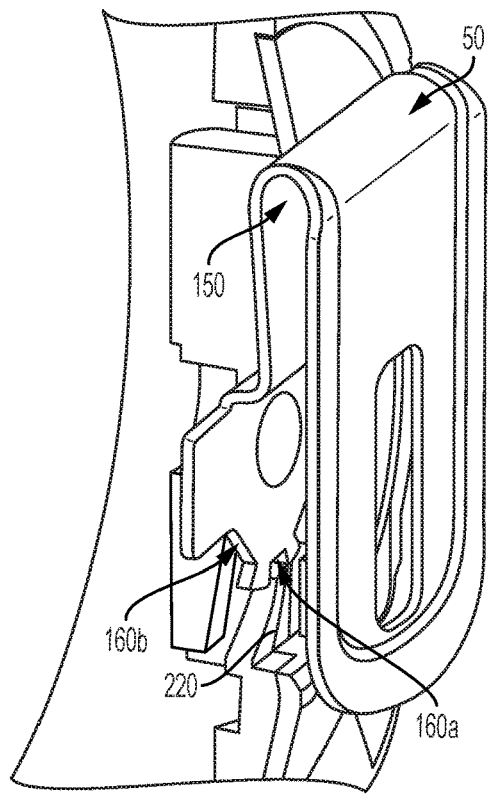
Figure 8A:
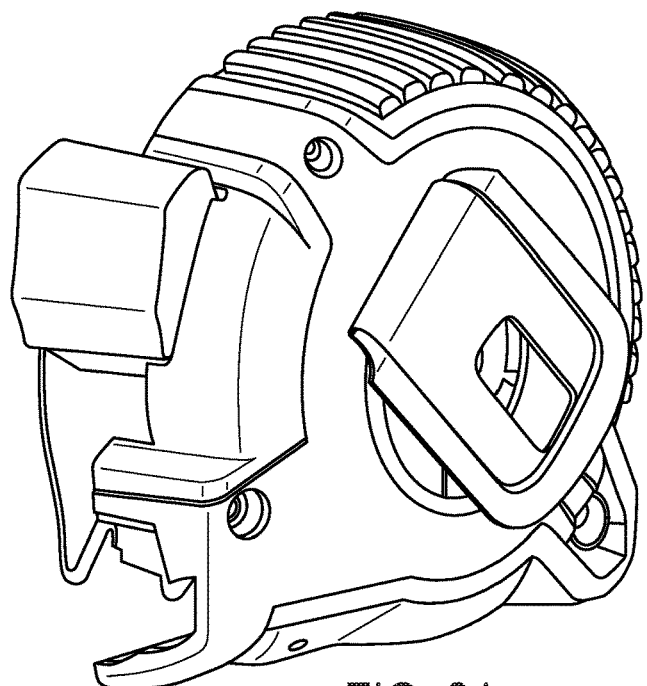
FIGS. 8A-B illustrate left perspective and enlarged sectional views of the tape measure of FIG. 1, showing engagement of the belt clip to the housing thereof as rotated to a down and rearward facing hook.
Figure 8B:
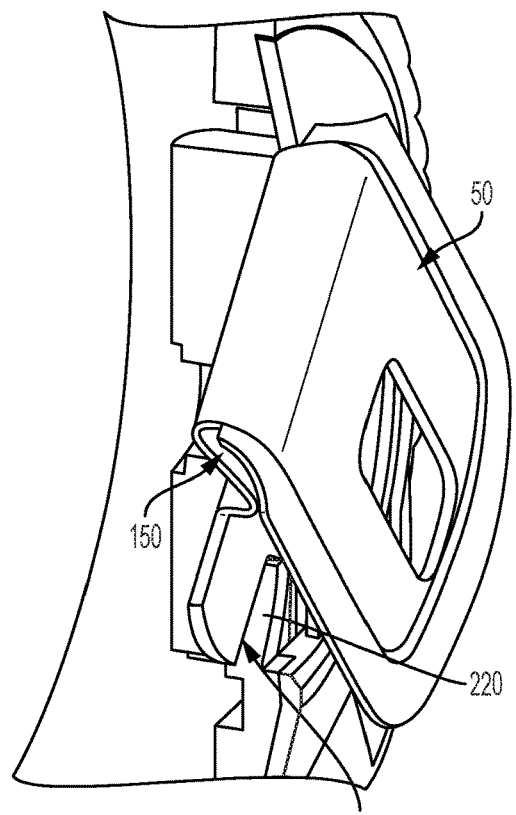
Figure 9A:
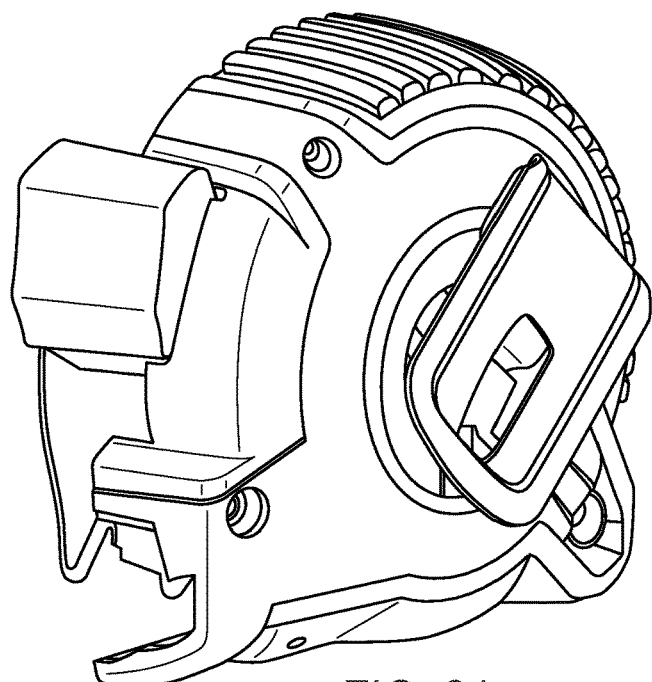
FIGS. 9A-B illustrate left perspective and enlarged sectional views of the tape measure of FIG. 1, showing engagement of the belt clip to the housing thereof as rotated to a down and forward facing hook.
Figure 9B:
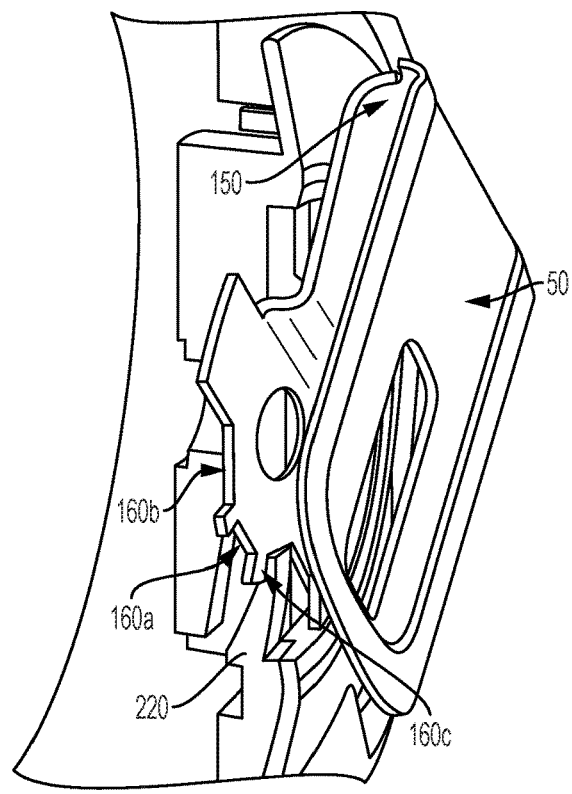

As shown in FIGS. 7A-B, in an embodiment an interlock tab 130a may be associated with positioning the loop region 150 defining the hook so that the opening of the hook points towards a base of the tape measure 10. As shown in FIGS. 8A-B, in an embodiment an interlock tab 130b may be associated with positioning the loop region 150 defining the hook so that the opening of the hook points halfway between the base and the back of the tape measure 10. As shown in FIGS. 9A-B, in an embodiment an interlock tab 130c may be associated with positioning the loop region 150 defining the hook so that the opening of the hook points halfway between the base and the front of the tape measure 10.

Figure 10:
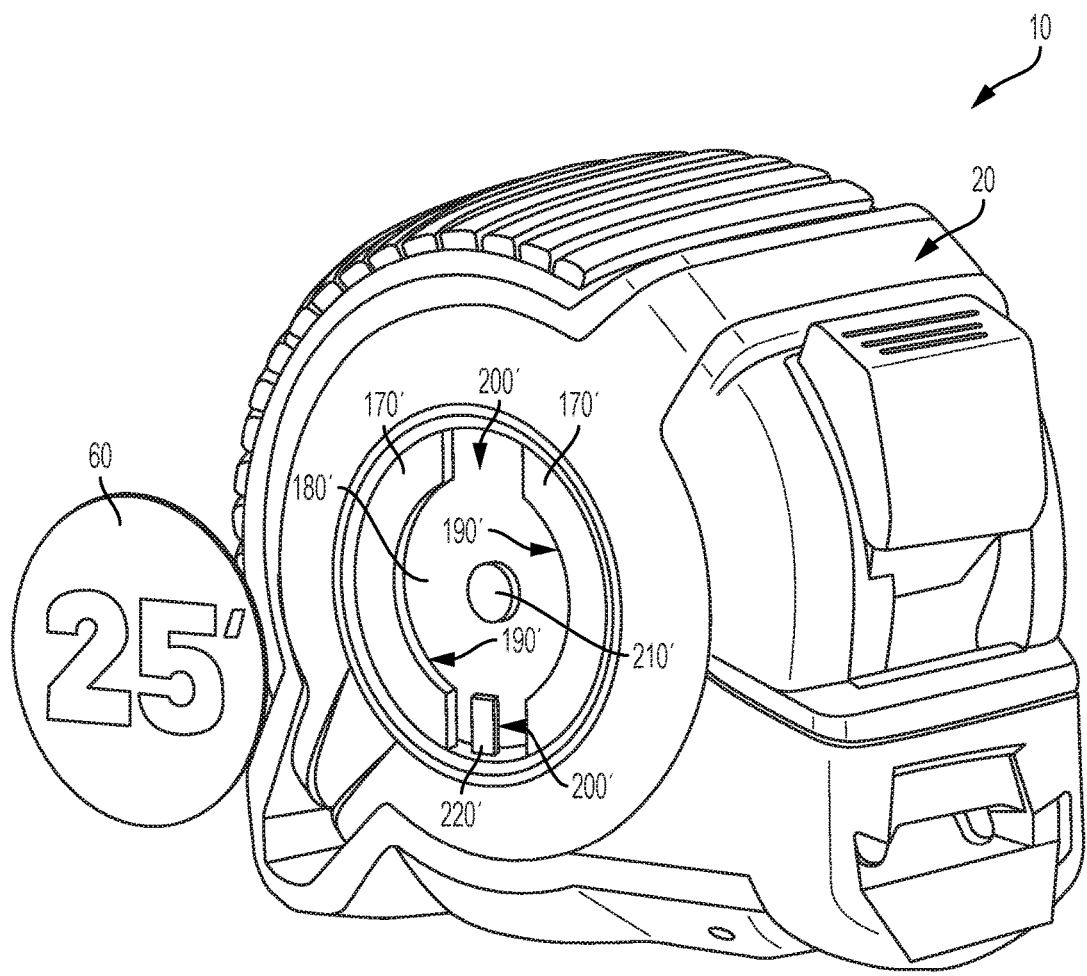
FIG. 10 illustrates a right perspective view of the tape measure of FIG. 1, showing removal of a cover plate over a belt clip receptacle thereon.

It may be appreciated in some embodiments that the portions of the housing 20 facilitating engagement with the belt clip 50 may be replicated on the opposing face of the housing 20. As indicated above, in an embodiment, the cover plate 60 may be removable to expose such portions. For example, as illustrated in FIG. 10, in an embodiment the cover plate 60 may be removable from the housing 20, to expose complementary features, including for example one or more of engagement flanges 170', recessed portion 180', spaces 190', gaps 200', pivot protrusion 210', and locking mechanism 220'. Accordingly, it may be appreciated that in some embodiments the cover plate 60 may be swapped for the belt clip 50, facilitating left or right handed configurations of the tape measure 10. In an embodiment, the cover plate 60 may include interlock tabs similar to the interlock tabs 130 which may be received through gaps 200' and rotate to be retained in the spaces 190' below the engagement flanges 170'. It may be appreciated that the cover plate 60 may include marketing or instructional indicia in some embodiments, and functionally in some embodiments may prevent debris from entering into the spaces 190 or other portions of the housing 20 adjacent to the recessed portion 180' (or recessed portion 180 when the belt hook is installed into the recessed portion 180', for example).

It may be appreciated that embodiments of the features of the belt clip 50 described above that engage the housing 20 may be implemented on other accessories. For example, instead of the belt clip 50, the features engageable with the housing 20 may be implemented on one or more of a flash light, laser pointer, laser level, laser distance measurer, knife pack, screwdriver bits, note pad, magnet, holster clip, pencil sharpener, pen or pencil holder, bottle opener, or combinations thereof. It may be appreciated that accessories such as the belt clip 50 or the other accessories described above may be utilized in conjunction with one another (e.g. on opposing sides of the housing 20) in various embodiments, or may be available to replace accessories on the tape measure 10.

As noted above, according to another aspect of the disclosure, improvements to the slide lock 70 may be implemented in some embodiments of the tape measure 10. For example, as illustrated in FIGS. 11A-D and 12A-D, according to some embodiments the housing 20 may include one or more protrusions 240 configured to provide additional locking functionality for the slide lock 70. For example, in an embodiment the protrusions 240 may selectively engage with one or more lock engagement tabs 250 on the slide lock 70, such that moving the slide lock 70 between a locked position engaging the tape 30 to prevent movement of the tape 30 relative to the housing 20, and an unlocked position where the tape 30 may move relative to the housing 20, requires depression of the actuator 80 prior to sliding the slide lock 70 in the channel 90. In an embodiment, the protrusions 240 may selectively engage with one or more lock engagement tabs 250 on the slide lock 70, such that moving the slide lock 70 between an unlocked position where the tape 30 may move relative to the housing 20 and a locked position engaging the tape 30 to prevent movement of the tape 30 relative to the housing 20 requires depression of the actuator 80 prior to sliding the slide lock 70 in the channel 90.

Figure 11A:
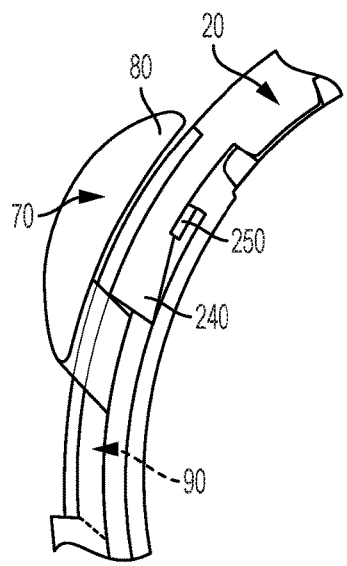
FIGS. 11A-D illustrate isolated sectional views of an embodiment of a slide lock according to an aspect of the disclosure, moving from a tape unlocked position to a tape locked position.
Figure 11B:
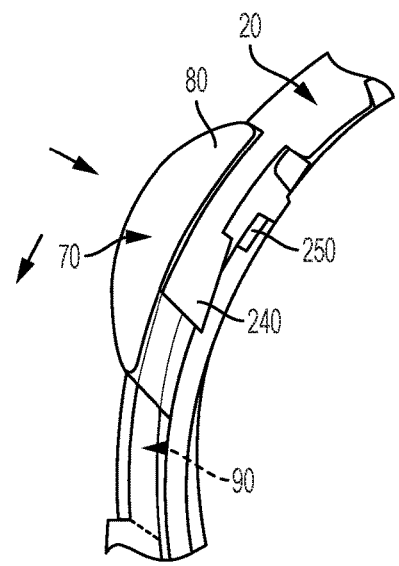
Figure 11C:
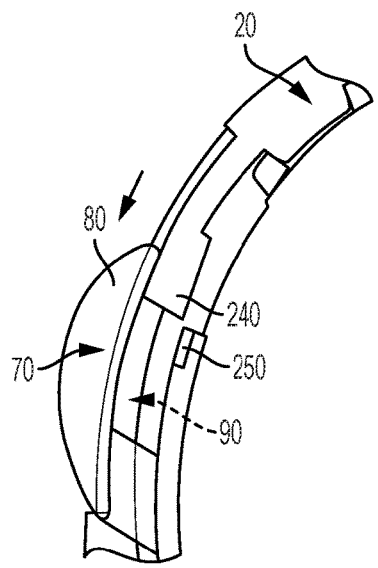
Figure 11D:
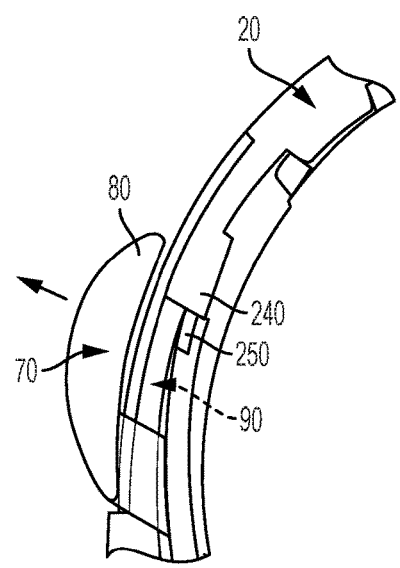

As shown in the embodiment illustrated in FIGS. 11A-D and 12A-D, in some embodiments the protrusions 240 may have a generally ramped shape which may bias the slide lock 70 into an unlocked position shown in FIG. 11A, however does not necessarily require depression of the actuator 80 in order to allow the lock engagement tabs 250 to move relative to the protrusion 240. Accordingly, FIGS. 11A-D illustrate an embodiment of moving the slide lock 70 from an unlocked position, shown in FIG. 11A to a locked position, shown in FIG. 11D. As shown in FIG. 11B, either depression of the actuator 80 or sliding movement of the actuator 80 down the channel 90 may cause the lock engagement tab 250 to slip relative to the protrusions 240. Accordingly, the slide lock 70 may move down the channel 90, pinning the tape 30 to the housing 20 when the slide lock 70 moves a sufficient distance close to the bottom of the channel 90. As shown in FIG. 11C and FIG. 11D, when the slide lock 70 is in the locked position, the slide lock 70 may recoil from the housing 20, such that the lock engagement tab 250 reengages the protrusion 240. In various embodiments, the slide lock 70 may be biased into the position with the lock engagement tab 250 engaging the protrusion 240, such as through one or more of internal material characteristics, spring bias, elasticity, mechanical engagement, or through any other appropriate mechanism.

Figure 12A:
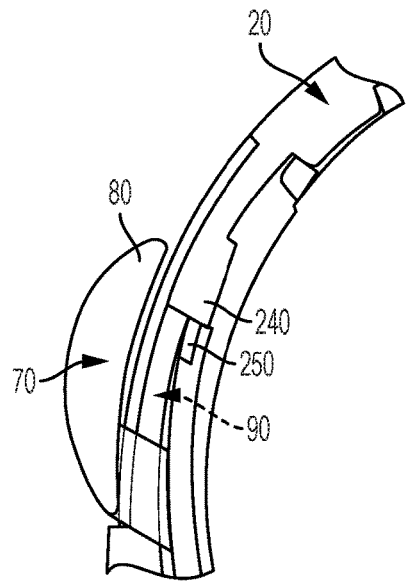
FIGS. 12A-D illustrate isolated sectional views of the slide lock of FIGS. 11A-D moving from a tape locked position to a tape unlocked position.
Figure 12B:
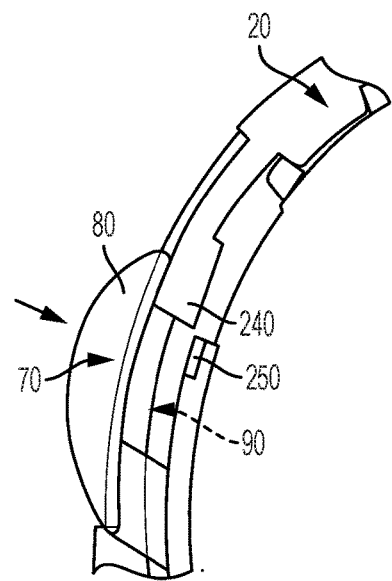
Figure 12C:
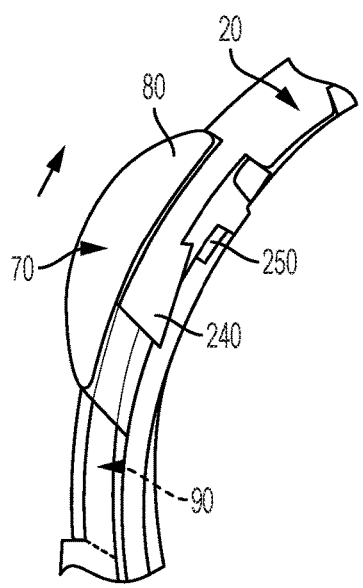
Figure 12D:
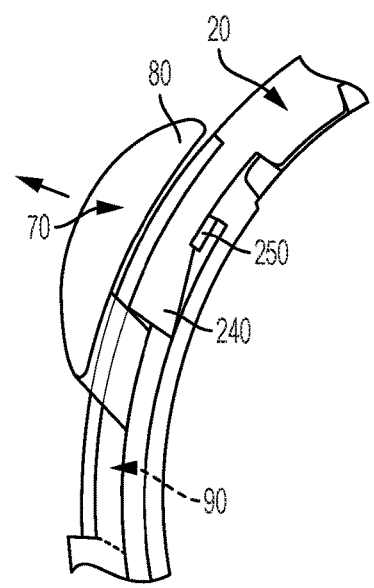

FIGS. 12A-D illustrate the process of unlocking the slide lock 70 so that the tape 30 may move relative to the housing. As shown in FIG. 12A, the portion of the protrusion 240 associated with the slide lock 70 being in the locked position is sufficiently sized such that attempting to slide the slide lock 70 back up the channel 90 to unlock the slide lock 70 and allow relative movement of the tape 30 to the housing 20 requires depression of the actuator 80 as shown in FIG. 12B, such that the lock engagement tab 250 disengages from the protrusion 240 (e.g., is pushed past a face thereof). As shown in FIG. 12C, once the lock engagement tab 250 is no longer blocked by the protrusion 240, the slide lock 70 may be slide back up the channel 90, disengaging the slide lock 70 (e.g., the tape engaging members 100 at a bottom thereof) from the tape 30, allowing the tape 30 to be slid relative to the housing 20. Again, in an embodiment the lock engagement tab 250 of the slide lock 70 may automatically reengage with the protrusion 240, which in various embodiments may alternatively require depression of the actuator 80 to allow re-locking of the slide lock 70, or may simply require sliding the actuator 80 down the channel 90 to reengage the slide lock 70 onto the tape 30.

It may be appreciated that in some embodiments, the slide lock 70 may be configured to be biased towards the unlocked position. As such, in an embodiment when the lock engagement tab 250 disengages from the protrusion 240 (e.g., through depression of the actuator 80), the bias of the slide lock 70 may cause the slide lock 70 to recoil away from the locked position, and in some embodiments may return completely to the unlocked position. It may be appreciated that a variety of configurations may facilitate such a bias to the slide lock 70. For example in some embodiments, such as that illustrated in FIG. 3A, the slide lock 70 may be stressed when in the locked position (e.g., through engagement with portions of the housing 20 or positioning of the slide lock 70 within the channel 90). Thus, potential energy may be stored within the slide lock 70 as it is compressed against one or more of the tape 30 and a receiving portion 252 (which may be coupled to or part of the housing 20). Accordingly, disengagement of the lock engagement tab 250 from the protrusion 240 may release the stress to automatically recoil the slide lock 70 away from the locked position, and may in some embodiments return the slide lock 70 to a fully unlocked position.

Figure 13A:
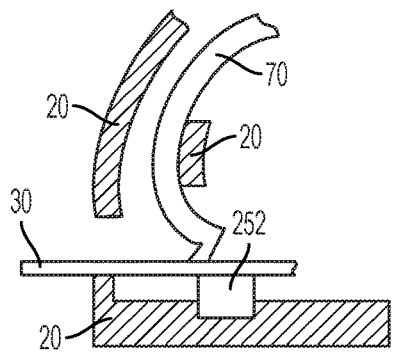
FIGS. 13A-E illustrate various isolated and sectional views of embodiments of the slide lock configured to automatically return from the tape locked position to the tape unlocked position.
Figure 13B:
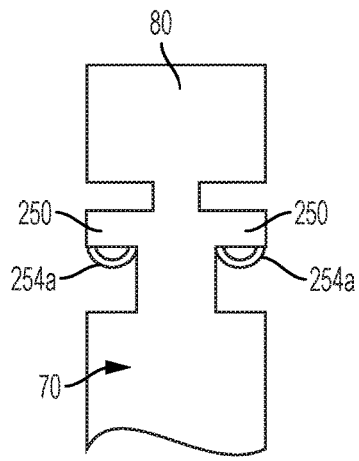
Figure 13C:
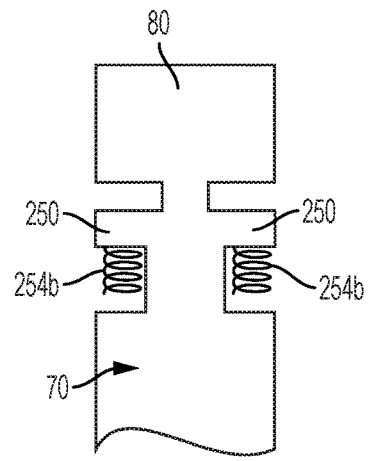

Other mechanisms to bias the slide lock 70 away from the locked position are possible in other embodiments. For example, in FIG. 13B, the slide lock 70 includes attached thereto a pair of leaf springs 254a, which may compress against portions of the housing 20 when the slide lock 70 is in the locked position, and spring the slide lock 70 away from the locked position when the lock engagement tab 250 is disengaged from the protrusion 240. While a pair of leaf springs 254a are illustrated in FIG. 13B, associated with each of a pair of lock engagement tabs 250, in other embodiments a single leaf spring 254a or additional leaf springs 254a may be associated with the slide lock 70, positioned on the lock engagement tabs 250 or elsewhere on the slide lock 70. Similarly, in FIG. 13C, the slide lock 70 includes attached thereto a pair of compression springs 254b, which may compress against portions of the housing 20 when the slide lock 70 is in the locked position, and spring the slide lock 70 away from the locked position when the lock engagement tab 250 is disengaged from the protrusion 240. While a pair of compression springs 254b are illustrated in FIG. 13C, associated with each of a pair of lock engagement tabs 250, in other embodiments a single compression spring 254b or additional compression springs 254b may be associated with the slide lock 70, positioned on the lock engagement tabs 250 or elsewhere on the slide lock 70.

Figure 13D:
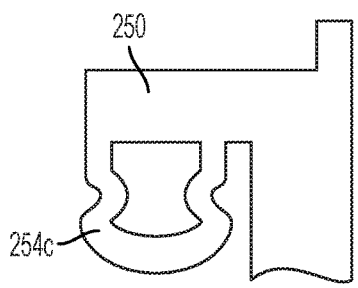

While in some embodiments the leaf springs 254a or compression springs 254b may be attached to the slide lock 70, in other embodiments a spring member may be integrally formed in the slide lock 70. For example, FIG. 13D illustrates an embodiment of a resilient geometry member 254c which may be integral to the lock engagement tab 250, and may have a deformable region which may compress against a portion of the housing 20 when the lock engagement tab 250 engages the protrusion 240, but generally returns to its original shape when the lock engagement tab 250 disengages from the protrusion 240, recoiling the slide lock 70 away from the locked position. It may be appreciated that other positions or configurations of the resilient geometry member 254c may be utilized in other embodiments.

Figure 13E:
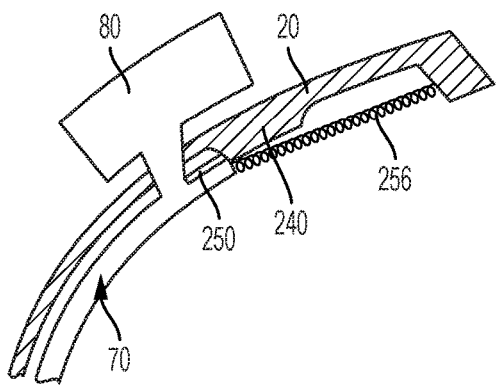

As shown in FIG. 13E, in another embodiment a tension spring 256 may be coupled between the slide lock 70 and a portion of the housing 20, which may tension when the slide lock 70 is moved into the locked position, pulling the slide lock 70 back to the unlocked position when the lock engagement tab 250 disengages from the protrusion 240. It may be appreciated that other tension configurations biasing the slide lock 70 away from the locked position are possible in other embodiments.

Figure 14A:
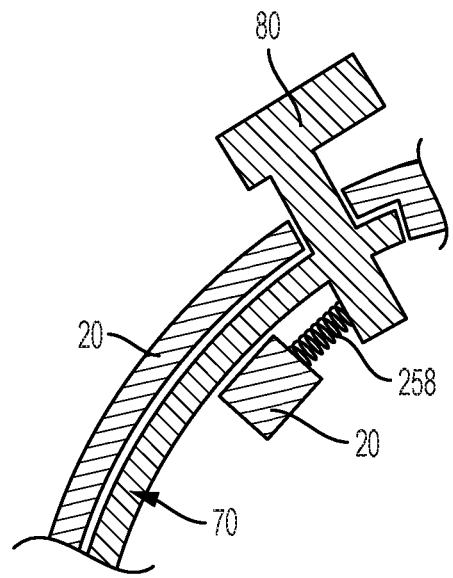
FIGS. 14-C illustrate isolated sectional views of an embodiment of the tape configured to automatically return the slide lock from the tape locked position to the tape unlocked position.
Figure 14B:
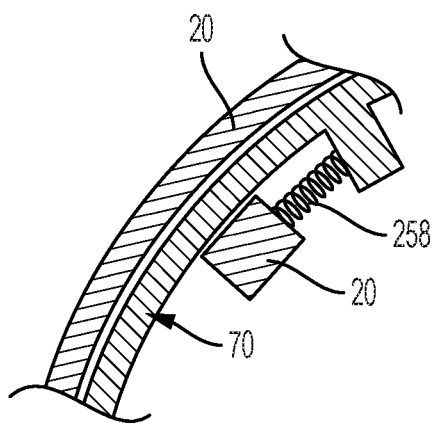
Figure 14C:
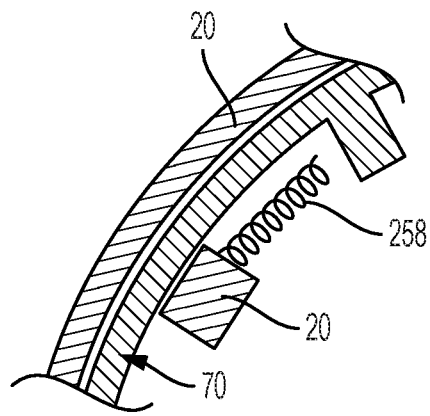

It may further be appreciated that in some embodiments a spring or other resilient member may be coupled to the housing 20 in a manner that selectively engages the slide lock 70 when the slide lock 70 is moved into the locked position. For example, as illustrated in FIGS. 14A-C, a compression spring 258 may be mounted to the housing 20. The compression spring 258 may engage a portion of the slide lock 70 when the slide lock 70 is in a locked position, as illustrated in FIG. 14A, but may then may expand to push the slide lock 70 back towards the unlocked position when the lock engagement tab 250 disengages from the protrusion 240, as shown in FIG. 14B. As further shown in FIG. 14C, in some embodiments the slide lock 70 may disengage from the compression spring 258 entirely in some embodiments when the slide lock 70 is in the unlocked position. It may further be appreciated that any of the other resilient members described above may alternatively be mounted to portions of the housing 20 to selectively engage with the slide lock 70 when the slide lock 70 is in the locked position. For example, while the compression spring 258 may be analogous to the compression spring 254*b*, the leaf spring 254*a* or the compliant geometry of the resilient geometry member 254*c* may be formed on the housing 20, to selectively engage with portions of the slide lock 70.

Figure 15:
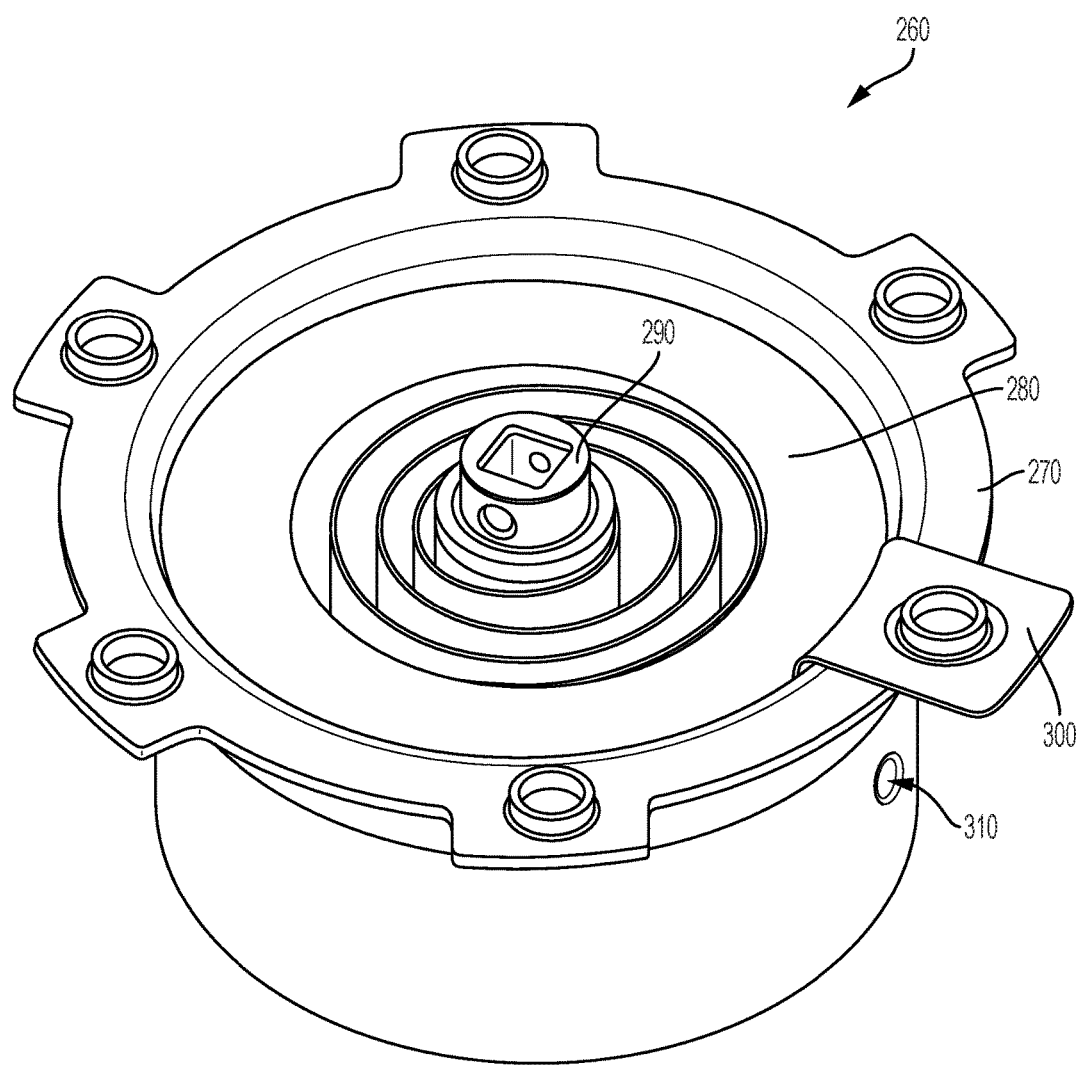
FIG. 15 illustrates an isolated perspective view of an embodiment of a tape measure motor assembly according to an aspect of the disclosure.

As further noted above, according to another aspect of the disclosure, improvements to the engagement between the tape 30 and the motor assembly that drives retraction of the tape 30 into the housing 20 may be implemented in some embodiments of the tape measure 10. Accordingly, FIG. 15 illustrates a motor assembly 260 about which the tape 30 may wrap around when housed within the housing 20. As shown, the motor assembly 260 may include a motor body 270, which in an embodiment may be shaped as a reel about which the tape 30 may wrap. Contained within the motor body 270 is a spring 280, which is fixed to a hub 290. It may be appreciated that the hub 290 may be fixed into the housing 20 (e.g., at one or more of the opposing ends thereof), such that the motor assembly 260 may rotate during extension and retraction of the tape 30 wound around the motor body 270, where the spring 280 may be loaded (or further loaded) by extension of the tape 30 from the housing 20, biasing the tape 30 into the housing 20. It may be appreciated that in other embodiments, the motor body 270 may be fixed to the housing 20, while the hub 290 may rotate within it. In some such embodiments, the hub 290 may be coupled to a separate reel housing the tape 30, or may be attached to a gear system facilitating retraction and extension of the tape 30.

Figure 16:
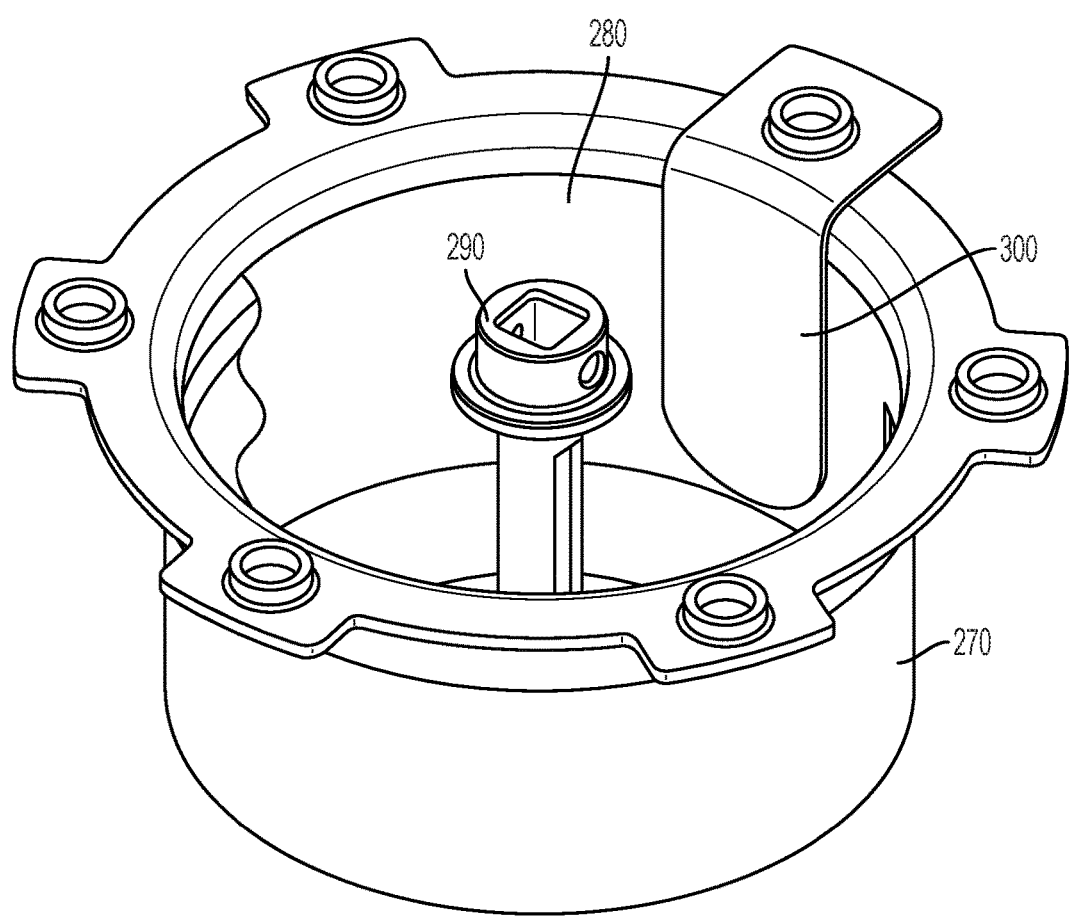
FIG. 16 illustrates a further isolated and rotated perspective view of the tape motor assembly of FIG. 15, to illustrate a backing plate facilitating welding thereof.

As described in greater detail below, it may be appreciated that according to some embodiments securing the spring 280 to the motor body 270 may be improved over conventional assemblies, via utilization of a backer plate 300 and a protrusion 310 to facilitate welding of the spring 280 to the motor body 270. FIG. 16 illustrates a perspective view rotated to that of FIG. 15, and further having truncated interior windings of the spring 280 so that an engagement between the motor body 270, the spring 280, and the backer plate 300. As shown, in an embodiment the backer plate 300 may have a bent configuration so as to encircle a winding the spring 280 between the backer plate 300 and the walls of the motor body 270.

It may therefore be appreciated that in an embodiment, the backer plate 300, the spring 280, and the motor body 270 may be welded together via application of electric current with one electrode contacting the backer plate and another electrode contacting the motor body 270 at the protrusion 310 thereof (e.g. via a protrusion weld). While in the illustrated embodiment the protrusion 310 is on the motor body 270, in another embodiment the protrusion may be located on the backer plate 300. In an embodiment, the backer plate 300 and the motor body 270 may be compressed together around the spring 280 along with the application of the electric current therebetween.

Figure 17:
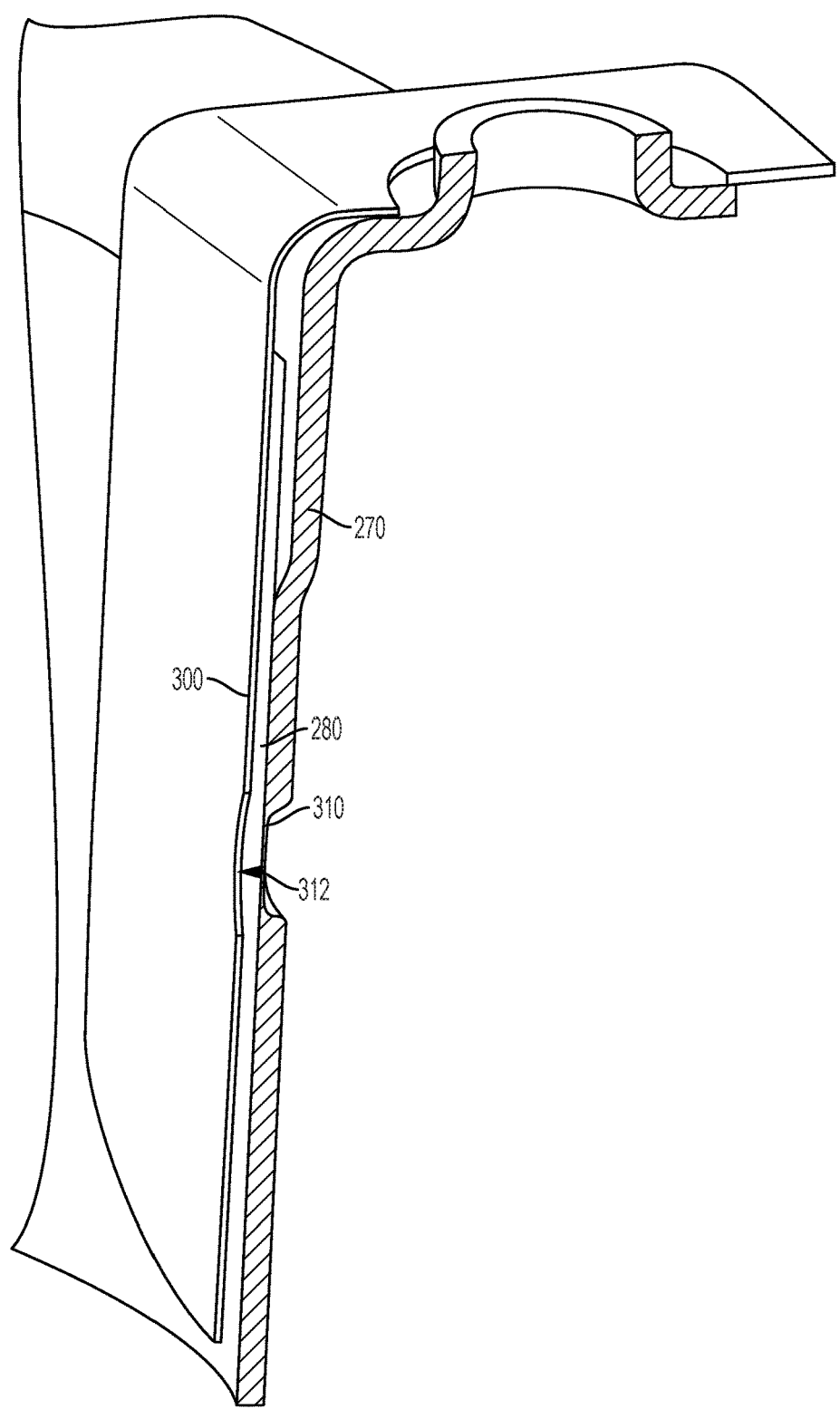
FIG. 17 illustrates a sectional perspective view of the tape motor assembly of FIGS. 15 and 16, depicting a weld therein.

It may be appreciated in various embodiments that the current facilitating the weld may flow from an electrode applied to the motor body 270 through the spring 280 and through the backer plate 300 to an electrode applied to an opposite face of the backer plate 300, or alternatively may be applied to the electrode applied to the backer plate 300, through the backer plate 300, through the spring 280, through the motor body 270, and to an electrode applied to the exterior of the motor body 270, regardless of whether the protrusion 310 is on the motor body 270 or on the backer plate 300. Accordingly, FIG. 17 illustrates a cross sectional view cutting across the protrusion 310 of the motor body 270, the spring 280, and the backer plate 300, showing the weld 312 thereof. It may be appreciated by one of ordinary skill in the art that the protrusion 310 may constitute any form of metallurgical bond region with or without a physical protrusion into or out of the motor body 270 in some embodiments.

In some embodiments, one or more of the motor body 270, the spring 280, and the backer plate 300 may be formed from one or more of stainless steel and high carbon steel. For example, in an embodiment, the motor body 270 and the backer plate 300 may be formed from stainless steel while the spring 280 therebetween may be formed from high carbon steel. In another embodiment, each of the motor body 270, the spring 280, and the backer plate 300 may be formed from high carbon steel. In an embodiment, a portion of the spring 280 may itself be utilized as a backer plate, such as by folding a tail end of the spring 280 back providing a weld electrode contacting surface that is not directly subjected to the spring forces applied to the spring 280 as the motor assembly 260 is rotated about the hub 290.

Figure 18A:
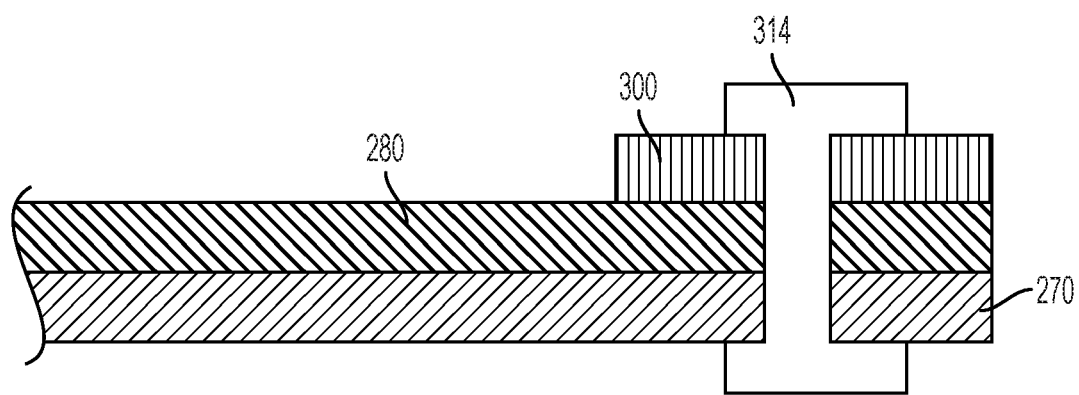
FIGS. 18A-D illustrate various views of alternate embodiments of a motor assembly having a backing plate facilitating adhesion of the spring into the tape motor assembly.

It may be appreciated that in some embodiments, alternate mechanisms for coupling the spring 280 to the motor body 270 utilizing the backer plate 300 outside of utilizing the weld 312 are possible in other embodiments. For example, instead of welding (or in particular protrusion welding), other mechanisms to bond the spring 280 to the motor body 270 may be utilized in some embodiments. For example, in an embodiment the bond may be formed through brazing, soldering, ultrasonic bonding, thermosonic bonding, or other such appropriate bonding mechanism. As another example, as shown in FIG. 18A, in an embodiment a rivet 314 or other fastener may be installed through apertures in the backer plate 300, the spring 280, and the motor body 270. It an embodiment, the backer plate 300 may comprise a washer. In an embodiment, the backer plate 300 may be integral to the rivet. 314 (e.g., sized appropriately to disperse the forces of applying the rivet across a sufficiently large region of the spring 280). In an embodiment, the backer plate 300 may be sized to move forces associated with applying the rivet 314 away from regions of the spring 280 residually affected by punching the hole therethrough.

Figure 18B:
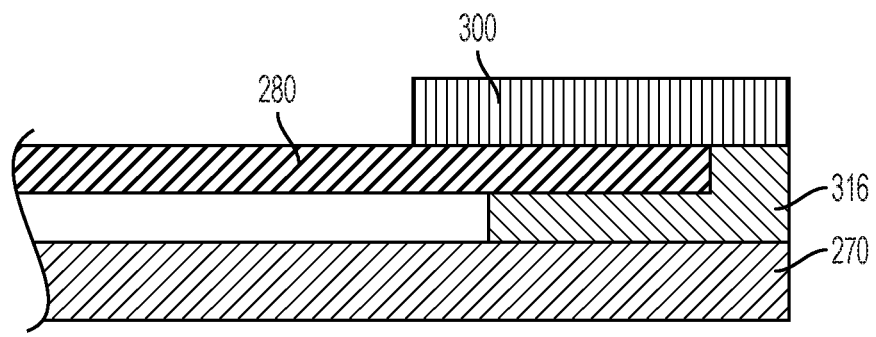
Figure 18C:
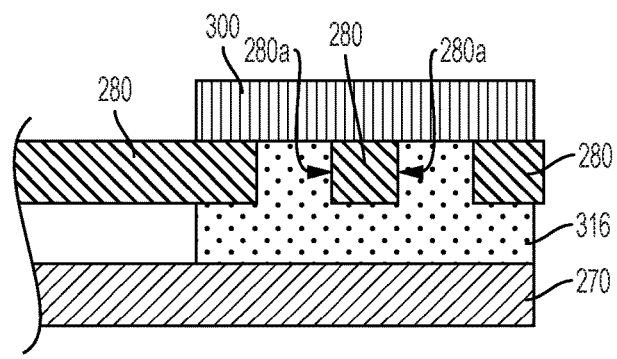
Figure 18C:
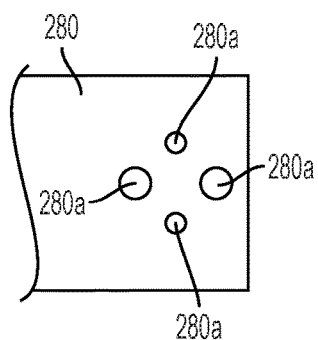
Figure 18D:
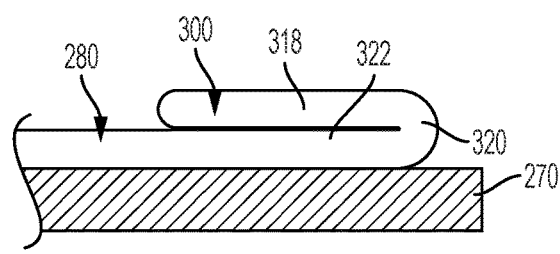

In another embodiment, as shown in FIG. 18B, an adhesive 316 may be applied to one or more of the spring 280, the motor body 270, and the backer plate 300. As shown, in an embodiment, the adhesive 316 may primarily be applied between the spring 280 and the backer plate 300. In an embodiment, some of the adhesive 316 may be applied between the backer plate 300 and the motor body 270, to secure the backer plate 300 to the motor body 270. It may be appreciated that in an embodiment the backer plate 300 may prevent inadvertent application of the adhesive to other regions of the spring 280 (e.g., interior windings thereof), which might occur in a high volume automated assembly environment, thus minimizing assembly time by reducing a need to wait for curing of the adhesive. In some embodiments, as shown in the sectional side view of FIG. 18C and the top view of the embodiment of the spring in FIG. 18C', the spring 280 may include apertures 280*a* therein, which may allow controlled seepage of the adhesive 316 between the motor body 270 through the apertures 280*a* to the backer plate 300.

In some embodiments, regardless of whether the spring 280 is bonded to the motor body 270 (e.g. via the weld 312, the rivet 314, or the adhesive 316), it may be appreciated that the backer plate 300 may be formed integrally from a terminal portion 318 of the spring 280, which may be folded back on itself at a fold point 320, so that the backer plate 300 is formed by an overlap of the terminal portion 318 extending behind an adjacent region 322 of the spring 280. It may further be appreciated that in some embodiments the backer plate 300 may be omitted, such that for example, a metallurgical bond or adhesive is applied between the motor body 270 and the spring 280.

Figure 19:
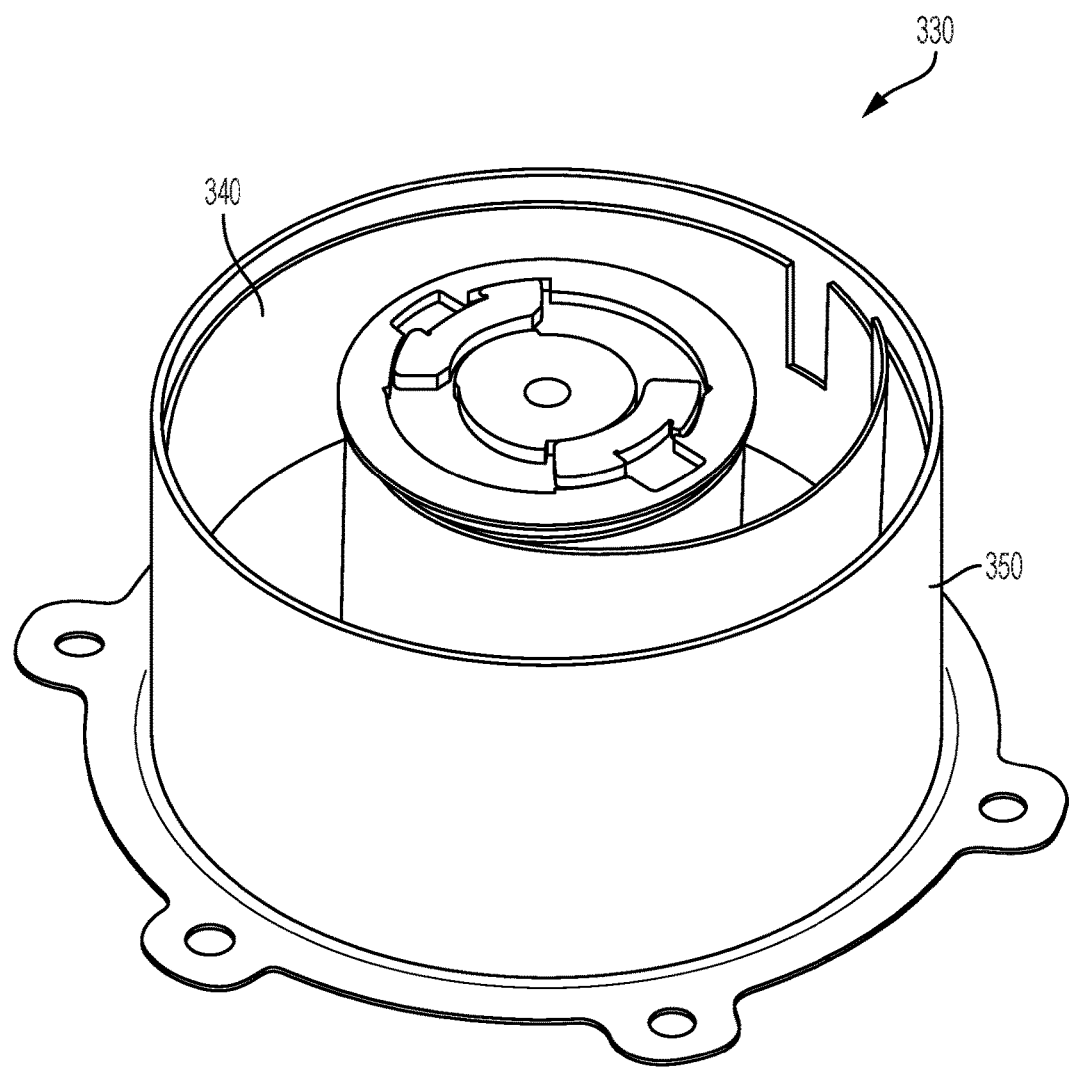
FIG. 19 illustrates an isolated perspective view of another embodiment of a tape measure motor assembly according to an aspect of the disclosure.
Figure 20B:
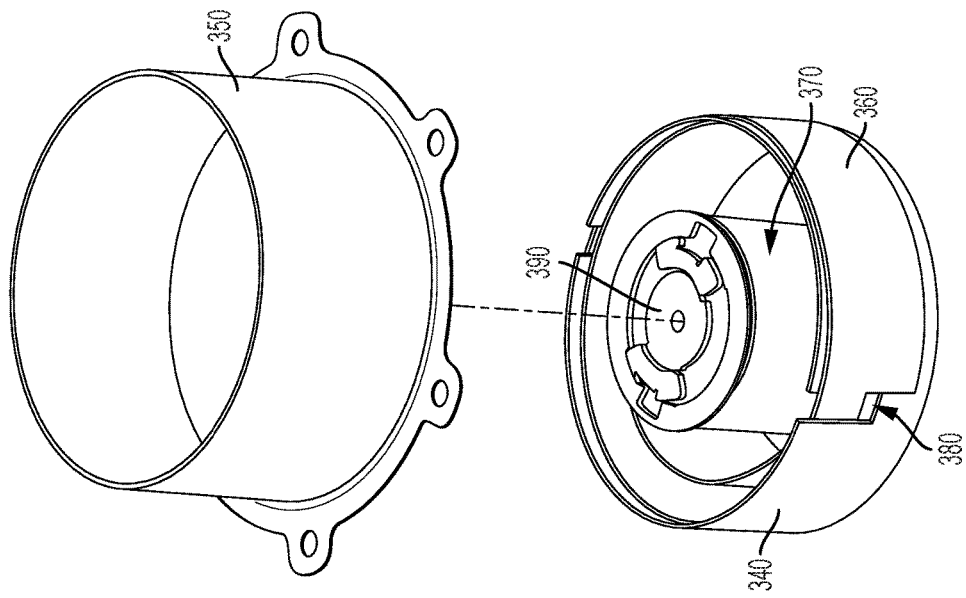
FIGS. 20A-B illustrate opposing partially exploded perspective views of the tape measure motor assembly of FIG. 19.
Figure 20A:
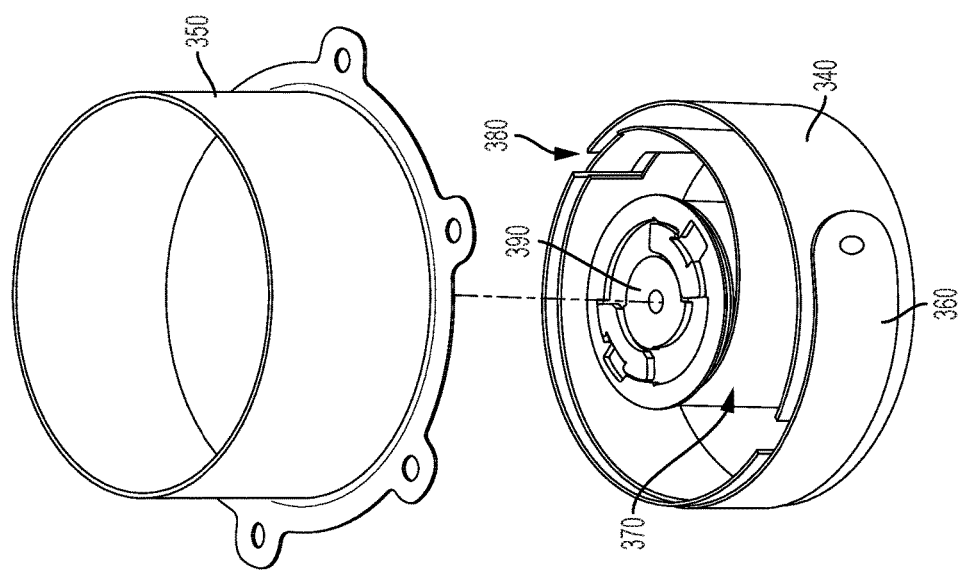

According to another aspect of the disclosure, a different improvement to the engagement between the tape 30 and the motor assembly that drives retraction of the tape 30 into the housing 20 may be implemented in some embodiments of the tape measure 10. Accordingly, FIG. 19 illustrates a motor assembly 330 that includes an inner motor body 340 and an outer motor body 350, as described in greater detail below. FIGS. 20A and 20B illustrate opposing perspective views of the motor assembly 330 with the outer motor body 350 spaced from the inner motor body 340. As shown, a tail end 360 of a spring 370 of the motor assembly 330 may extend out of an opening 380 in the inner motor body 340 (e.g., in the outer circumference thereof) while the opposite end of the spring 370 is fixed in a hub 390. The tail end 360 may then wrap around the outer region of the outer circumference of the inner motor body 340, as shown in FIGS. 20A and 20B.

Figure 21:
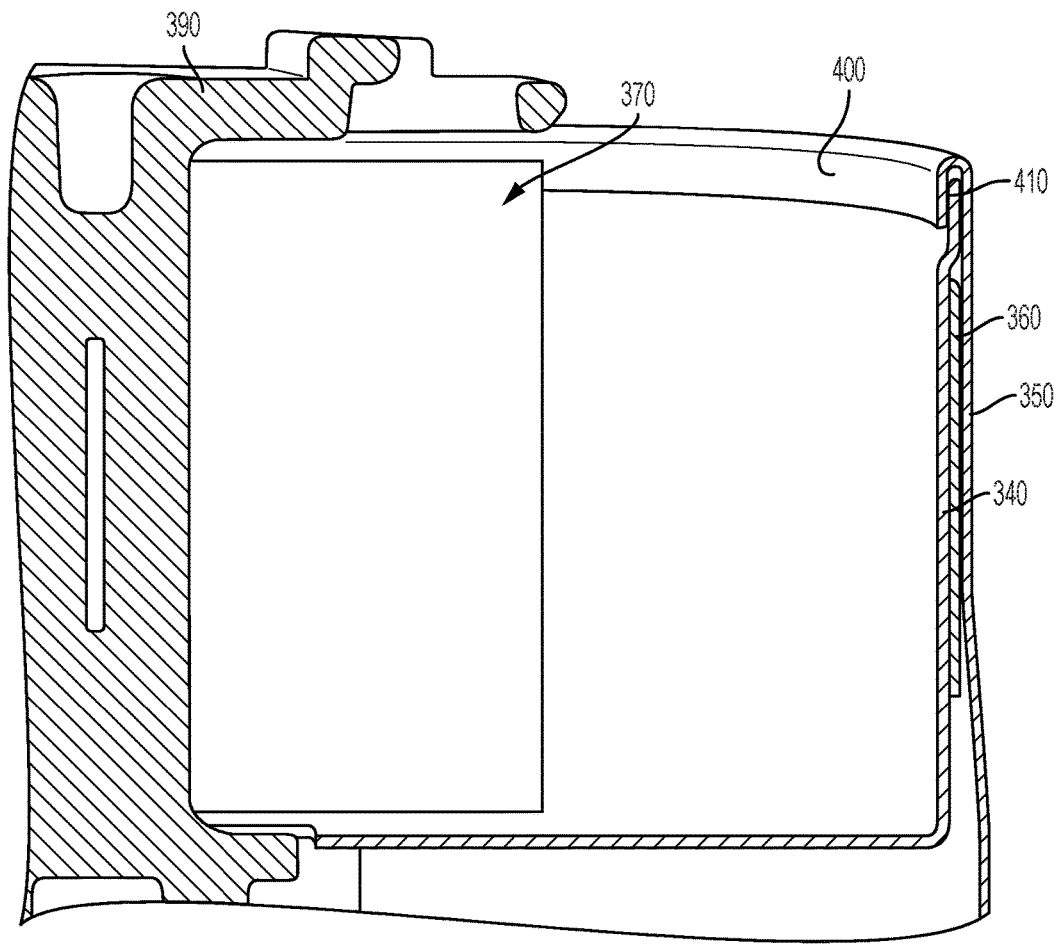
FIG. 21 illustrates a cross sectional view of the tape measure motor assembly of FIG. 19.

As shown in FIG. 21, when the outer motor body 350 is assembled onto the inner motor body 340, the tail end 360 of the spring 370 may thus be trapped between the inner motor body 340 and the outer motor body 350, such that the spring 370 is fixed between the hub 390 and the combination of the inner motor body 340 and outer motor body 350. As further shown in FIG. 21, in an embodiment the outer motor body 350 may include a flange 400 which may envelop and receive a protrusion 410 of the inner motor body 340, and in an embodiment may clamp, compress, or otherwise fix the outer motor body 350 to the inner motor body 340, securing the tail end 360 of the spring 370 therebeteween adjacent to the flange 400 and protrusion 410.

As described with reference to the hub 290 above, in some embodiments the hub 390 may be fixed into the housing 20 (e.g., at one or more of the opposing ends thereof), such that the motor assembly 330 may rotate during extension and retraction of the tape 30 wound around the motor body 330, where the spring 370 may be loaded (or further loaded) by extension of the tape 30 from the housing 20, biasing the tape 30 into the housing 20. It may be appreciated in some embodiments that the outer motor body 350 may have a smooth outer circumference which may provide a smooth bearing surface for the tape 30 wound around it (e.g., fixed to the outer motor body 350 in any appropriate mechanism, including but not limited to the tape 30 engaging an interlock aperture in the outer motor body 350, or being welded, brazed, epoxied, clamped, bolted or otherwise affixed to the outer motor body 350).

Alternatively, and similarly to the disclosure above with reference to the hub 290, the combination of the inner motor body 340 and outer motor body 350 may be fixed relative to the housing 20 or other portions of the tape measure 10, while the hub 390 is rotatable relative thereto. It may be appreciated that such rotatable configurations may be useful in embodiments where it is desirable for the outer motor body 350 to have a smooth outer circumference providing a smooth bearing surface. For example, in some embodiments the motor assembly 330 may be utilized as part of motor assemblies utilizing multiple springs, such as that disclosed in U.S. Pat. No. 9,207,058, which is incorporated herein by reference in its entirety. Alternatively, the rotatable hub 390 may couple with or engage a separate reel housing the tape 30, or may engage a gearing system that drives movement of the tape 30.

It may be appreciated that the components described herein may be of different constructions or configurations, including but not limited to one or more being comprised of different material choices. For example, the components described herein may each be constructed from a variety of materials, including but not limited to one or more plastics, metals, rubbers, elastomers, or any other appropriate material choice. For example, in an embodiment one or more of the components may be formed of aluminum (e.g., machined aluminum), iron (e.g., steel), or any other appropriate material. In some embodiments, the material choices may differ from component to component.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A tape measure comprises:
   a housing having a left side and a right side surrounding a front;
   a tape selectively extendable from and retractable to the front of the housing; and
   a slide lock at the front configured to selectively clamp the tape to the housing to prevent extension and retraction of the tape from the front of the housing when the slide lock is in a locked position;
   wherein the slide lock comprises an actuator on an exterior of the housing and a lock engagement tab on an interior of the housing, the actuator and the lock engagement tab being coupled together with a portion of the slide lock extending through a channel in which the slide lock is slidable;
   wherein the lock engagement tab engages with a protrusion in the housing when moving the slide lock from the locked position to an unlocked position, such that movement of the slide lock into the unlocked position requires depression of the actuator towards the interior of the housing to disengage the lock engagement tab from the protrusion prior to sliding the slide lock in the channel from the locked position to the unlocked position.

2. The tape measure of claim 1, wherein one of the protrusion and the lock engagement tab is further shaped to engage the other of the protrusion and the lock engagement tab when moving the slide lock from the unlocked position to the locked position, such that movement of the slide lock into the locked position requires depression of the actuator towards the interior of the housing to disengage the lock engagement tab from the protrusion.

3. The tape measure of claim 1, wherein the slide lock is configured to automatically return to the unlocked position when the lock engagement tab is disengaged from the protrusion.

4. The tape measure of claim 3, wherein the slide lock is stressed when in the locked position, and wherein disengagement of the lock engagement tab from the protrusion releases the stress to automatically return the slide lock to the unlocked position.

5. A tape measure comprising:
a housing having a left side and a right side surrounding a front;
a tape selectively extendable from and retractable to the front of the housing; and
a slide lock at the front configured to selectively clamp the tape to the housing to prevent extension and retraction of the tape from the front of the housing when the slide lock is in a locked position;
wherein the slide lock comprises an actuator on an exterior of the housing and a lock engagement tab on an interior of the housing, the actuator and the lock engagement tab being coupled together with a portion of the slide lock extending through a channel in which the slide lock is slidable;
wherein the lock engagement tab engages with a protrusion in the housing when moving the slide lock from the locked position to an unlocked position, such that movement of the slide lock into the unlocked position requires depression of the actuator towards the interior of the housing to disengage the lock engagement tab from the protrusion; and
wherein the slide lock is biased out of the housing, such that the lock engagement tab is biased into a slidably engageable position to engage with the protrusion when the actuator is not depressed towards the interior of the housing.

6. A tape measure comprising:
a housing having a left side and a right side surrounding a front;
a tape selectively extendable from and retractable to the front of the housing; and
a slide lock at the front configured to selectively clamp the tape to the housing to prevent extension and retraction of the tape from the front of the housing when the slide lock is in a locked position;
wherein the slide lock comprises an actuator on an exterior of the housing and a lock engagement tab on an interior of the housing, the actuator and the lock engagement tab being coupled together with a portion of the slide lock extending through a channel in which the slide lock is slidable;
wherein the lock engagement tab engages with a protrusion in the housing when moving the slide lock from the locked position to an unlocked position, such that movement of the slide lock into the unlocked position requires depression of the actuator towards the interior of the housing to disengage the lock engagement tab from the protrusion;
wherein the slide lock is configured to automatically return to the unlocked position when the lock engagement tab is disengaged from the protrusion; and
wherein the slide lock comprises a return member configured to bias the slide lock away from the locked position.

7. The tape measure of claim 6, wherein the return member comprises one or more of an appendage molded into the slide lock, a coil spring, a leaf spring, and an appendage molded into the housing.

* * * * *